(12) United States Patent
Ionescu et al.

(10) Patent No.: US 8,386,728 B1
(45) Date of Patent: Feb. 26, 2013

(54) METHODS AND SYSTEMS FOR PRIORITIZING A CRAWL

(75) Inventors: Mihai Florin Ionescu, Mountain View, CA (US); David Marmaros, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1913 days.

(21) Appl. No.: 10/940,314

(22) Filed: Sep. 14, 2004

Related U.S. Application Data

(63) Continuation-in-part of application No. 10/815,060, filed on Mar. 31, 2004.

(51) Int. Cl.
*G06F 12/00* (2006.01)
*G06F 13/00* (2006.01)
*G06F 13/28* (2006.01)

(52) U.S. Cl. ........................................ 711/158
(58) Field of Classification Search .................. 711/158
See application file for complete search history.

(56) References Cited

U.S. PATENT DOCUMENTS

| | | |
|---|---|---|
| 4,410,957 A | 10/1983 | Cason et al. |
| 5,280,612 A | 1/1994 | Lorie et al. |
| 5,305,205 A | 4/1994 | Weber |
| 5,321,838 A | 6/1994 | Hensley et al. |
| 5,539,809 A | 7/1996 | Mayer et al. |
| 5,555,346 A | 9/1996 | Gross et al. |
| 5,566,336 A | 10/1996 | Futatsugi et al. |
| 5,592,378 A | 1/1997 | Cameron et al. |
| 5,623,652 A | 4/1997 | Vora et al. |
| 5,701,469 A | 12/1997 | Brandli et al. |
| 5,742,816 A | 4/1998 | Barr et al. |
| 5,748,954 A | 5/1998 | Mauldin |
| 5,781,192 A | 7/1998 | Kodimer |
| 5,793,948 A | 8/1998 | Asahi et al. |
| 5,819,273 A | 10/1998 | Vora et al. |
| 5,845,300 A | 12/1998 | Comer et al. |
| 5,872,976 A | 2/1999 | Yee et al. |
| 5,881,315 A | 3/1999 | Cohen |
| 5,907,836 A | 5/1999 | Sumita et al. |
| 5,913,208 A | 6/1999 | Brown et al. |
| 5,940,594 A | 8/1999 | Ali et al. |
| 5,956,722 A | 9/1999 | Jacobson |

(Continued)

FOREIGN PATENT DOCUMENTS

| | | |
|---|---|---|
| JP | 2000-099441 | 4/2000 |
| JP | 2001-5705 | 1/2001 |

(Continued)

OTHER PUBLICATIONS

U.S. Appl. 10/749,440, filed Dec. 31, 2003, Badros et al.

(Continued)

*Primary Examiner* — Sheng-Jen Tsai
(74) *Attorney, Agent, or Firm* — Fenwick & West LLP

(57) ABSTRACT

Methods and systems for prioritizing a crawl are described. One aspect of the invention includes a method for identifying a plurality of storage locations each comprising a plurality of articles, ranking the plurality of storage locations based at least in part on events associated with the plurality of articles, and crawling the storage locations based at least in part on the ranking. Another aspect of the invention includes identifying a plurality of storage locations each comprising a plurality of articles, identifying a plurality of types of the plurality of articles, ranking the plurality of storage locations based at least in part on the plurality of types of the plurality of articles; and crawling the storage locations based at least in part on the ranking.

77 Claims, 4 Drawing Sheets

U.S. PATENT DOCUMENTS

| | | |
|---|---|---|
| 5,961,610 A | 10/1999 | Kelly et al. |
| 5,964,839 A | 10/1999 | Johnson et al. |
| 6,006,222 A | 12/1999 | Culliss |
| 6,014,665 A | 1/2000 | Culliss |
| 6,029,195 A | 2/2000 | Herz |
| 6,055,579 A | 4/2000 | Goyal et al. |
| 6,073,130 A | 6/2000 | Jacobson et al. |
| 6,078,916 A | 6/2000 | Culliss |
| 6,115,802 A | 9/2000 | Tock et al. |
| 6,119,147 A | 9/2000 | Toomey et al. |
| 6,175,830 B1 | 1/2001 | Maynard |
| 6,182,065 B1 | 1/2001 | Yeomans |
| 6,182,068 B1 | 1/2001 | Culliss |
| 6,184,880 B1 | 2/2001 | Okada |
| 6,199,067 B1 | 3/2001 | Geller |
| 6,202,065 B1 | 3/2001 | Wills |
| 6,209,000 B1 | 3/2001 | Klein et al. |
| 6,226,630 B1 | 5/2001 | Bilmers |
| 6,236,768 B1 | 5/2001 | Rhodes et al. |
| 6,236,978 B1 | 5/2001 | Tuzhilin |
| 6,240,548 B1 | 5/2001 | Holzle et al. |
| 6,269,369 B1 | 7/2001 | Robertson |
| 6,275,820 B1 | 8/2001 | Navin-Chandra et al. |
| 6,275,957 B1 | 8/2001 | Novik et al. |
| 6,282,548 B1 | 8/2001 | Burner et al. |
| 6,321,228 B1 | 11/2001 | Crandall et al. |
| 6,341,371 B1 | 1/2002 | Tandri |
| 6,346,952 B1 | 2/2002 | Shtivelman |
| 6,347,374 B1 | 2/2002 | Drake et al. |
| 6,349,299 B1 | 2/2002 | Spencer et al. |
| 6,363,373 B1 | 3/2002 | Steinkraus |
| 6,370,563 B2 | 4/2002 | Murakami et al. |
| 6,380,924 B1 | 4/2002 | Yee et al. |
| 6,393,421 B1 | 5/2002 | Paglin |
| 6,393,438 B1 | 5/2002 | Kathrow et al. |
| 6,401,239 B1 | 6/2002 | Miron |
| 6,446,076 B1 | 9/2002 | Burkey et al. |
| 6,477,585 B1 | 11/2002 | Cohen et al. |
| 6,480,837 B1 | 11/2002 | Dutta |
| 6,490,577 B1 | 12/2002 | Anwar |
| 6,513,036 B2 | 1/2003 | Fruensgaard et al. |
| 6,526,405 B1 | 2/2003 | Mannila et al. |
| 6,532,023 B1 | 3/2003 | Schumacher et al. |
| 6,560,655 B1 | 5/2003 | Grambihler et al. |
| 6,564,213 B1 | 5/2003 | Ortega et al. |
| 6,581,056 B1 | 6/2003 | Rao |
| 6,592,627 B1 | 7/2003 | Agrawal et al. |
| 6,604,236 B1 | 8/2003 | Draper et al. |
| 6,631,345 B1 | 10/2003 | Schumacher et al. |
| 6,658,423 B1 | 12/2003 | Pugh et al. |
| 6,662,226 B1 | 12/2003 | Wang et al. |
| 6,681,247 B1 | 1/2004 | Payton |
| 6,684,250 B2 | 1/2004 | Anderson et al. |
| 6,691,175 B1 | 2/2004 | Lodrige et al. |
| 6,694,353 B2 | 2/2004 | Sommerer |
| 6,697,838 B1 | 2/2004 | Jakobson |
| 6,707,471 B2 | 3/2004 | Funaki |
| 6,708,293 B2 | 3/2004 | Kaler et al. |
| 6,728,763 B1 | 4/2004 | Chen |
| 6,772,143 B2 | 8/2004 | Hung |
| 6,779,030 B1 | 8/2004 | Dugan et al. |
| 6,782,381 B2 | 8/2004 | Nelson et al. |
| 6,820,075 B2 | 11/2004 | Shanahan et al. |
| 6,826,553 B1 | 11/2004 | DaCosta et al. |
| 6,850,934 B2 | 2/2005 | Bates et al. |
| 6,853,950 B1 | 2/2005 | O'Reilly et al. |
| 6,864,901 B2 | 3/2005 | Chang et al. |
| 6,865,715 B2 | 3/2005 | Uchino et al. |
| 6,873,982 B1 | 3/2005 | Bates et al. |
| 6,877,027 B1 | 4/2005 | Spencer et al. |
| 6,879,691 B1 | 4/2005 | Koretz |
| 6,901,378 B1 | 5/2005 | Linker et al. |
| 6,907,577 B2 | 6/2005 | Tervo |
| 6,934,740 B1 | 8/2005 | Lawande et al. |
| 6,957,229 B1 | 10/2005 | Dyor |
| 6,963,830 B1 | 11/2005 | Nakao |
| 6,968,509 B1 | 11/2005 | Chang et al. |
| 6,981,040 B1 | 12/2005 | Konig et al. |
| 6,983,310 B2 | 1/2006 | Rouse et al. |
| 6,985,913 B2 | 1/2006 | Murata |
| 6,999,957 B1 | 2/2006 | Zamir et al. |
| 7,016,919 B2 | 3/2006 | Cotton et al. |
| 7,080,073 B1 * | 7/2006 | Jiang et al. ............... 707/7 |
| 7,096,255 B2 | 8/2006 | Malik |
| 7,099,887 B2 | 8/2006 | Hoth et al. |
| RE39,326 E | 10/2006 | Comer et al. |
| 7,162,473 B2 * | 1/2007 | Dumais et al. ............... 1/1 |
| 7,188,316 B2 | 3/2007 | Gusmorino et al. |
| 7,200,802 B2 | 4/2007 | Kawatani |
| 7,219,184 B2 | 5/2007 | Stojancic |
| 7,233,948 B1 | 6/2007 | Shamoon et al. |
| 7,240,049 B2 | 7/2007 | Kapur |
| 7,245,910 B2 | 7/2007 | Osmo |
| 7,249,158 B2 | 7/2007 | Naitou |
| 7,257,822 B1 | 8/2007 | Sambhus et al. |
| 7,265,858 B2 | 9/2007 | Park et al. |
| 7,328,242 B1 | 2/2008 | McCarthy et al. |
| 7,330,536 B2 | 2/2008 | Claudatos et al. |
| 7,337,448 B1 | 2/2008 | Dalia et al. |
| 7,343,365 B2 | 3/2008 | Farnham et al. |
| 7,346,613 B2 * | 3/2008 | Hurst-Hiller et al. ......... 707/711 |
| 7,376,640 B1 | 5/2008 | Anderson et al. |
| 7,383,307 B2 | 6/2008 | Kirkland et al. |
| 7,412,491 B2 | 8/2008 | Gusler et al. |
| 7,437,444 B2 | 10/2008 | Houri |
| 7,441,246 B2 | 10/2008 | Auerbach et al. |
| 7,457,872 B2 | 11/2008 | Aton et al. |
| 7,467,390 B2 | 12/2008 | Gilgen et al. |
| 7,475,406 B2 | 1/2009 | Banatwala et al. |
| 7,499,974 B2 | 3/2009 | Karstens |
| 7,500,249 B2 | 3/2009 | Kampe et al. |
| 7,516,118 B1 | 4/2009 | Badros et al. |
| 7,546,602 B2 | 6/2009 | Hejlsberg et al. |
| 7,562,367 B1 | 7/2009 | Arad |
| 7,577,667 B2 | 8/2009 | Hinshaw et al. |
| 7,602,382 B2 | 10/2009 | Hinckley et al. |
| 7,634,546 B1 | 12/2009 | Strickholm et al. |
| 7,650,403 B2 | 1/2010 | Koetke et al. |
| 7,676,553 B1 * | 3/2010 | Laucius et al. ............... 709/219 |
| 7,941,439 B1 | 5/2011 | Lawrence et al. |
| 2001/0002469 A1 | 5/2001 | Bates et al. |
| 2001/0016852 A1 | 8/2001 | Peairs et al. |
| 2002/0042789 A1 | 4/2002 | Michalewicz et al. |
| 2002/0049608 A1 | 4/2002 | Hartsell et al. |
| 2002/0056089 A1 | 5/2002 | Houston |
| 2002/0059245 A1 | 5/2002 | Zakharov et al. |
| 2002/0059425 A1 | 5/2002 | Belfiore et al. |
| 2002/0065802 A1 | 5/2002 | Uchiyama |
| 2002/0073076 A1 | 6/2002 | Xu et al. |
| 2002/0078256 A1 | 6/2002 | Gehman et al. |
| 2002/0087507 A1 | 7/2002 | Hopewell et al. |
| 2002/0091568 A1 | 7/2002 | Kraft et al. |
| 2002/0091972 A1 | 7/2002 | Harris et al. |
| 2002/0103664 A1 | 8/2002 | Olsson et al. |
| 2002/0116291 A1 | 8/2002 | Grasso et al. |
| 2002/0138467 A1 | 9/2002 | Jacobson et al. |
| 2002/0156760 A1 | 10/2002 | Lawrence et al. |
| 2002/0165903 A1 | 11/2002 | Zargham et al. |
| 2002/0174101 A1 | 11/2002 | Fernley et al. |
| 2002/0178383 A1 | 11/2002 | Hrabik et al. |
| 2002/0184224 A1 | 12/2002 | Haff et al. |
| 2002/0184406 A1 | 12/2002 | Aliffi |
| 2003/0001854 A1 | 1/2003 | Jade et al. |
| 2003/0018521 A1 | 1/2003 | Kraft et al. |
| 2003/0023586 A1 | 1/2003 | Knorr |
| 2003/0028506 A1 | 2/2003 | Yu |
| 2003/0028896 A1 * | 2/2003 | Swart et al. ............... 725/127 |
| 2003/0036848 A1 | 2/2003 | Sheha et al. |
| 2003/0036914 A1 | 2/2003 | Fitzpatrick |
| 2003/0041112 A1 | 2/2003 | Tada et al. |
| 2003/0050909 A1 * | 3/2003 | Preda et al. ............... 707/1 |
| 2003/0055816 A1 | 3/2003 | Paine et al. |
| 2003/0055828 A1 | 3/2003 | Koch et al. |
| 2003/0088433 A1 | 5/2003 | Young et al. |
| 2003/0097361 A1 | 5/2003 | Huang et al. |
| 2003/0123442 A1 | 7/2003 | Drucker et al. |
| 2003/0123443 A1 | 7/2003 | Anwar |

| | | |
|---|---|---|
| 2003/0126136 A1* | 7/2003 | Omoigui .................... 707/10 |
| 2003/0130984 A1 | 7/2003 | Quinlan et al. |
| 2003/0131000 A1 | 7/2003 | Bates et al. |
| 2003/0131061 A1 | 7/2003 | Newton et al. |
| 2003/0149694 A1* | 8/2003 | Ma et al. .................... 707/9 |
| 2003/0154071 A1 | 8/2003 | Shreve |
| 2003/0167266 A1 | 9/2003 | Saldanha et al. |
| 2003/0182480 A1 | 9/2003 | Varma et al. |
| 2003/0187837 A1 | 10/2003 | Culliss |
| 2003/0233366 A1 | 12/2003 | Kesselman et al. |
| 2004/0002959 A1 | 1/2004 | Alpert et al. |
| 2004/0003038 A1 | 1/2004 | Huang et al. |
| 2004/0031027 A1 | 2/2004 | Hiltgen |
| 2004/0054737 A1 | 3/2004 | Daniell |
| 2004/0064447 A1 | 4/2004 | Simske et al. |
| 2004/0093317 A1 | 5/2004 | Swan |
| 2004/0095852 A1 | 5/2004 | Griner et al. |
| 2004/0098609 A1 | 5/2004 | Bracewell et al. |
| 2004/0103409 A1 | 5/2004 | Hayner et al. |
| 2004/0128285 A1* | 7/2004 | Green et al. ................ 707/3 |
| 2004/0133560 A1 | 7/2004 | Simske |
| 2004/0133561 A1 | 7/2004 | Burke |
| 2004/0141594 A1 | 7/2004 | Brunson et al. |
| 2004/0143569 A1 | 7/2004 | Gross et al. |
| 2004/0155910 A1 | 8/2004 | Chang et al. |
| 2004/0168150 A1 | 8/2004 | Ziv |
| 2004/0186848 A1 | 9/2004 | Kobashikawa et al. |
| 2004/0186896 A1 | 9/2004 | Daniell et al. |
| 2004/0187075 A1 | 9/2004 | Maxham et al. |
| 2004/0193596 A1 | 9/2004 | Defelice et al. |
| 2004/0203642 A1 | 10/2004 | Zatloufai et al. |
| 2004/0205773 A1 | 10/2004 | Carcido et al. |
| 2004/0215715 A1 | 10/2004 | Ehrich et al. |
| 2004/0230572 A1 | 11/2004 | Omoigui |
| 2004/0235520 A1 | 11/2004 | Cadiz et al. |
| 2004/0254928 A1 | 12/2004 | Vronay et al. |
| 2004/0254938 A1 | 12/2004 | Marcjan et al. |
| 2004/0255301 A1 | 12/2004 | Turski et al. |
| 2004/0261026 A1 | 12/2004 | Corson |
| 2004/0267700 A1 | 12/2004 | Dumais et al. |
| 2004/0267756 A1 | 12/2004 | Bayardo et al. |
| 2005/0021542 A1 | 1/2005 | Irle et al. |
| 2005/0033803 A1 | 2/2005 | Vleet et al. |
| 2005/0050547 A1 | 3/2005 | Whittle et al. |
| 2005/0057584 A1 | 3/2005 | Gruen et al. |
| 2005/0060310 A1 | 3/2005 | Tong et al. |
| 2005/0060719 A1 | 3/2005 | Gray et al. |
| 2005/0076115 A1 | 4/2005 | Andrews et al. |
| 2005/0080866 A1 | 4/2005 | Kent, Jr. et al. |
| 2005/0108213 A1 | 5/2005 | Riise et al. |
| 2005/0108332 A1 | 5/2005 | Vaschillo et al. |
| 2005/0114021 A1 | 5/2005 | Krull et al. |
| 2005/0114487 A1 | 5/2005 | Peng et al. |
| 2005/0165777 A1* | 7/2005 | Hurst-Hiller et al. ........ 707/4 |
| 2005/0192921 A1 | 9/2005 | Chaudhuri et al. |
| 2005/0216482 A1 | 9/2005 | Ponessa |
| 2005/0251526 A1 | 11/2005 | Nayak |
| 2005/0262073 A1 | 11/2005 | Reed et al. |
| 2006/0031365 A1 | 2/2006 | Kay et al. |
| 2006/0085750 A1 | 4/2006 | Easton et al. |
| 2006/0106778 A1 | 5/2006 | Baldwin |
| 2006/0167704 A1 | 7/2006 | Nicholls et al. |
| 2006/0190470 A1 | 8/2006 | Lemnotis |
| 2006/0224553 A1 | 10/2006 | Chtcherbatchenko et al. |
| 2006/0288075 A1 | 12/2006 | Wu |
| 2007/0016556 A1 | 1/2007 | Ann et al. |
| 2007/0022155 A1 | 1/2007 | Owens et al. |
| 2007/0055689 A1 | 3/2007 | Rhoads et al. |
| 2007/0078860 A1 | 4/2007 | Enenkiel |
| 2007/0208697 A1 | 9/2007 | Subramaniam et al. |

FOREIGN PATENT DOCUMENTS

| | | |
|---|---|---|
| JP | 2003-242176 | 8/2003 |
| JP | 2003-296365 | 10/2003 |
| JP | 2004-062451 | 2/2004 |
| RU | 2138076 C1 | 9/1999 |
| WO | WO 01/62004 A2 | 8/2001 |
| WO | WO 02/069118 A2 | 9/2002 |
| WO | WO 2005/006129 A2 | 1/2005 |

OTHER PUBLICATIONS 80-20 Software—Products—80-20 One Search, http://www.80-20.com/products/one-search/retriever.asp, printed Mar. 16, 2004.

"askSam™ Making Information Useful," askSam,—Organize your Information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.atmaden.ibm.com/cs/wbi/papers/chi97/wbipaper.html, pp. 1-13, printed Mar. 16, 2004.

Battelle, J., CNN.com "When geeks go camping, Ideas hatch," http://www.cnn.com/2004/TECH/ptech/01/09/bus2.feat.geek.camp/index.html, pp. 1-3, printed Jan. 13, 2004.

Boyan. J., et al, "A Machine Learning Architecture for Optimizing Web Search Engines," School of Computer Science, Carnegie Melton University, May 10, 1996, pp. 1-8.

Bradenbaugh, F., "Chapter 1 The Client-Side Search Engine," *JavaScript Cookbook*, $1^{st}$ Ed., Oct. 1999, O'Reily™ Online catalog, http://www.oreilly.com/catalog/iscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921.com/921.htm, pp. 1-18, 1998.

Budzik, J., et al, User Interactions with Everyday Applications as Context for Just-in-time Information Access, Intelligent Information Laboratory, Northwestern University, pp. 1-8, no date.

DEVONthink, http://www.devon-techonologies.com/products/devonthink.php, printed Mar. 16, 2004.

dtSearch®—http://www.dtsearch.com/, printed Mar. 15, 2004.

Dumais, S., et al, "Stuff I've Seen: A System for Personal Information Retrieval and Re-Use." Microsoft Research, *SIGIR '03*, Jul. 28-Aug. 1, 2003, pp. 1-8.

Enfish, http://www.enfish.com, printed Mar. 16, 2004.

Fast Search & Transfer—Home—Enterprise Search, http://sotutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=108594389&e1=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—HomePage, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated Information retrieval system," *The Proceedings of the First International Conference on the Practical Application of Intelligent Agents and Multi Agent Technology (PAAM '96)*, pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.asox?oull+/library/en-us/dnwinfs/htm . . . , pp. 1-5, printed Apr. 21, 2004.

"Searching for the next Google—New trends are helping nimble startups elbow in to the plundered market" RED HERRING—The Business of Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com., http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project" http://www-2.cs.cmu.edu/~webwatcher/, printed Oct. 15, 2003.

"WhenU Just-In-Time Marketing," http://www.whenu.com, printed Mar. 19, 2004.

X1 Instantly searches files & email. For outlook, Outlook, http://www.x1.com/, printed Mar. 15, 2004.

Zellweger., P., et al., "Fluid Links for Informed and Incremental Link Transitions," Proceedings of Hypertext'98, Pittsburgh, PA, Jun. 20-24, 1998, pp. 50-57.

U.S. Appl. No. 10/814,773, filed Mar. 31, 2004, Lawrence et al.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

Knezevic, P. et al., "The Architecture of The Obelix—An Improved Internet Search Engine," Proceedings of the 33$^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/spectorcne_windows/help/v40/webhelp/>.

International Preliminary Report on Patentabiity, PCT/US2005/003386, Jun. 24, 2005, 8 pages.

International Search Report and Written Opinion, PCT/US2005/003386, Jun. 28, 2005.

International Search Report and Written Opinion, PCT/US2005/010985, Apr. 26, 2007, 9 pages.

International Search Report and Written Opinion, PCT/US2004/038562, Apr. 6, 2005.

Bengel, J., et al., "Archiving and Indexing Chat Utterances," Electrical Engineering and Computer-Science and Information Technology Telecommunications Center University of Kansas, 2003.

Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.

Pingali, G. S., et al., "Instantly Indexed Multimedia Databases of Real World Events," IEEE Transactions on Multimedia, Jun. 2002, pp. 269-282, vol. 4, Issue 2.

Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.

PCT International Search Report and Written Opinion, PCT/US05/10687, Sep. 10, 2008, 14 Pages.

PCT International Search Report and Written Opinion, PCT/US05/10685, Jul. 3, 2008, 11 Pages.

Examination Report, European Patent Application No. 05731427.0, Jul. 28, 2008, 5 Pages.

European Examination Report, European Application No. EP 05731490.8, Jul. 7, 2008, 5 pages.

European Search Report, European Application No. EP 05731490.8, Apr. 28, 2008, 4 pages.

Bacon, J. et al., "Event Storage and Federation Using ODMG," 2000, pp. 265-281, vol. 2135, [online] Retrieved from the Internet<URL: http://citeseer.ist.psu.edu/bacon00event.html>.

Spiteri, M.D. et al., "An Architecture to Support Storage and Retrieval of Events," Sep. 1998, pp. 443-458, [online] Retrieved from the Internet<URL:http://citeseerist.psu.edu/spiteri98architecture.html>.

Spiteri, M.D., "An Architecture for the Notification, Storage and Retrieval of Events," Jan. 2000, pp. 1-165 pages, [online] Retrieved from the Internet<URL:http://citeseer.ist.psu.edu/spiteri00architecture.html>.

Jonathan Bennett & Autolt Team, "Autolt v3 Homepage," Verson v3.0.102, 1999-2004, 26 pages, [online] [Archived on Aug. 13, 2004; Retrieved on Dec. 2, 2008] Retrieved from the internet <URL:http://web.archive.org/web/20040813195143/http://www.autoitscript.com/autoit3/docs/>.

Budzik, J., "Information access in context," Knowledge-Based Systems, Elsevier 2001, pp. 37-53, vol. 14.

Gemmell, J., et al., "Living with a Lifetime Store," Proc. ATR Workshop on Ubiquitous Experience Media, Sep. 9-10, 2003, pp. 69-76.

Gemmell, J., et al., "The MyLifeBits Lifetime Store," Proceedings of the 2003 ACM SIGMM Workshop on Experimental Telepresence, Nov. 7, 2003, pp. 80-83.

Rekimoto, J., "Time-Machine Computing: A Time-centric Approach for the Information Environment," Proceedings of the Annual ACM Symposium on User Interface Software and Technology, Nov. 7, 1999, pp. 1-10.

* cited by examiner

US 8,386,728 B1

METHODS AND SYSTEMS FOR PRIORITIZING A CRAWL

RELATED APPLICATION

This application is a continuation-in-part to U.S. application Ser. No. 10/815,060, entitled "Methods and Systems for Collecting and Updating Information from a Crawl," filed Mar. 31, 2004, the contents of which are hereby incorporated by reference.

FIELD OF THE INVENTION

The invention generally relates to search engines. More particularly, the invention relates to methods and systems for prioritizing a crawl.

BACKGROUND OF THE INVENTION

Users generate and access a large number of articles, such as e-mails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional search applications "crawl" a storage device to index data stored on the storage device. For example, a conventional network-device search application crawls various storage devices associated with a network, such as the Internet, to locate data such as articles on the various storage devices. Links to articles and associated data are stored for subsequent retrieval by the network-device search application, such as in response to a search query.

Crawls performed by some conventional client-device search applications can significantly degrade the performance of the client device. For example, some conventional client-device search applications typically use batch processing to index some or all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Some conventional client-device search applications also need to rebuild the index at each batch processing or build new partial indexes and perform a merge operation that can use a lot of client-device resources. Some conventional client-device search applications also sometimes use a great deal of memory when operational, resulting in slower performance of the client device.

Additionally, conventional search applications can require an explicit search query from a user to generate results.

SUMMARY OF THE INVENTION

Embodiments of the present invention comprise methods and systems that prioritize a crawl. One aspect of one embodiment of the present invention comprises identifying a plurality of storage locations each comprising a plurality of articles, ranking the plurality of storage locations based at least in part on events associated with the plurality of articles, and crawling the storage locations based at least in part on the ranking.

Another aspect of one embodiment of the present invention comprises identifying a plurality of storage locations each comprising a plurality of articles, identifying a plurality of types of the plurality of articles, ranking the plurality of storage locations based at least in part on the plurality of types of the plurality of articles, and crawling the storage locations based at least in part on the ranking.

Another aspect of one embodiment of the present invention comprises identifying a plurality of storage locations each comprising a plurality of articles, identifying a plurality of types of the plurality of articles, ranking the plurality of storage locations based at least in part on the plurality of types of the plurality of articles and based at least in part on events associated with the plurality of articles, and crawling the storage locations based at least in part on the ranking.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for prioritizing a crawl. There are multiple embodiments of the present invention. By way of introduction and example, in one exemplary embodiment of the present invention, a search engine can identify relevant content, such as documents, in particular storage locations on a hard drive or other storage devices associated with a client device. Depending on the relevancy of the content in each storage location, such as the presence of a frequently accessed document in a particular storage location, the storage locations can be prioritized for crawling. The search engine can then crawl the relevant content in these storage locations in a prioritized manner and index the content to make the content available for a subsequent search result.

By way of one example, a search engine can identify file directories associated with frequently accessed documents in a "My Favorites" folder on a hard drive. The search engine can rank each of these file directories according to the frequency of access associated with a predefined number of documents, such as ranking the file directories associated with the top 20 most frequently accessed documents in a "My Favorites" folder. In this manner, a frequently accessed document "patent1.doc" in directory "c:/ip" that has previously been accessed 100 times by a particular user can be more relevant than another frequently accessed document such as "patent1.xls" in directory "c:/fun" that has been previously accessed 9 times by the particular user. Thus, the file directories (such as "c:/ip") associated with the more frequently accessed documents (such as "patent1.doc") can be ranked relatively higher than the directories (such as "c:/fun") associated with the less frequently accessed documents (such as "patent1.xls"). The search engine can then crawl the storage locations based at least in part on the ranking, such as crawling the file directory "c:/ip" containing the more frequently accessed document "patent1.doc" prior to crawling, if at all, file directory "c:/fun" containing the less frequently accessed document "patent1.xls." In this manner, the search engine can initially crawl the file directories which contain the most frequently accessed documents on a user's hard drive.

This introduction is given to introduce the reader to the general subject matter of the application. By no means is the invention limited to such subject matter. Exemplary embodiments are described below.

System Architecture

Figure 1:
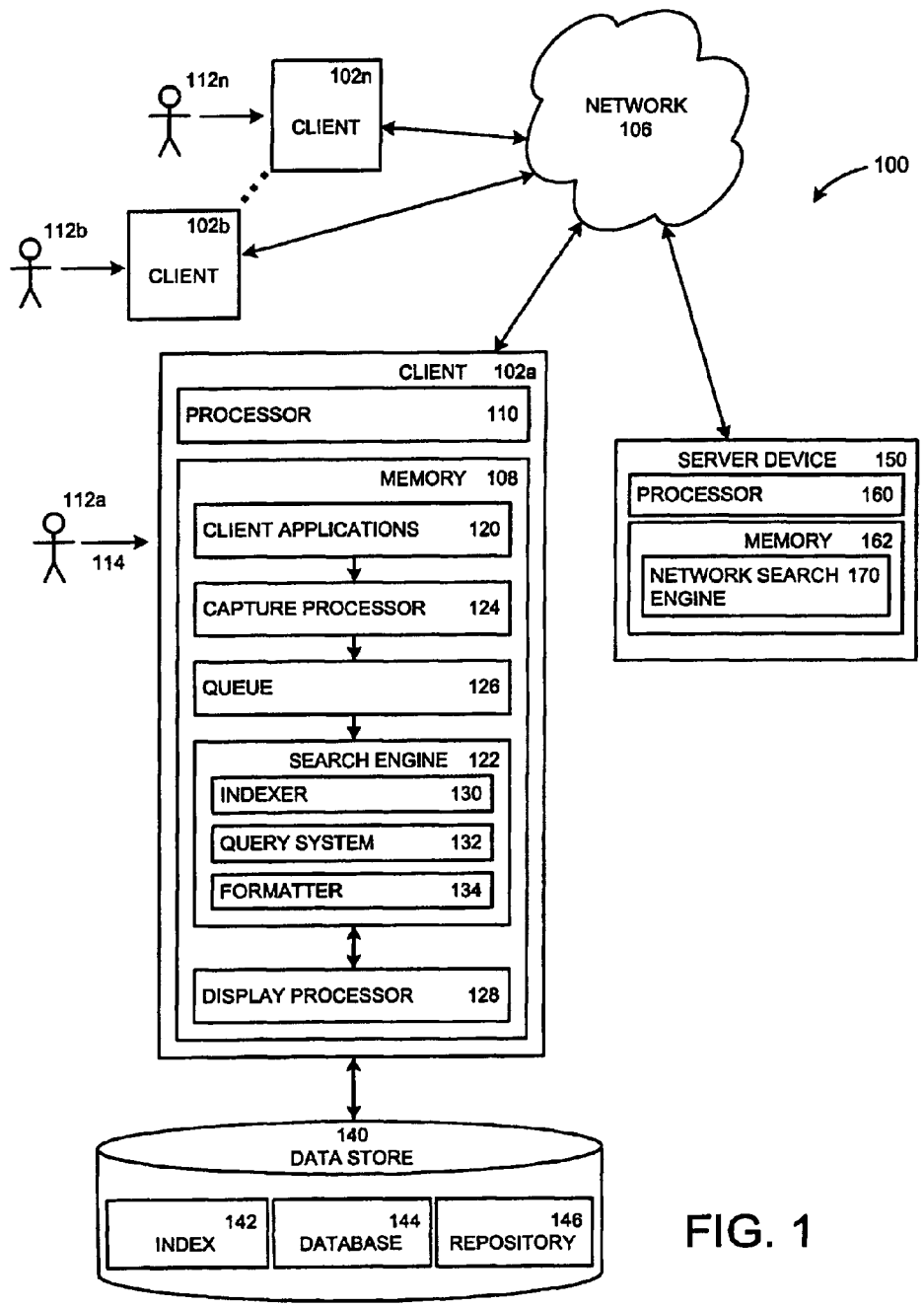
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine program architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processors, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a shown can comprise a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, e-mails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an e-mail or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine 122 receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or conversion facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and extracting event data associated with an event. Examples of events include sending or receiving an e-mail message, a user viewing a web page, saving a word processing document, printing a spreadsheet document, inputting text to compose or edit an e-mail, opening a presentation application, closing an instant messenger application, entering a keystroke, moving the mouse, and hovering the mouse over a hyperlink. An example of event data captured by the capture processor 124 for an event involving the viewing of a web page by a user can comprise the URL of the web page, the time and date the user viewed the web page, the content of the web page in original or processed forms, a screenshot of the page as displayed to the user, a thumbnail version of the screenshot, and image data associated with the web page. An example of event data captured by the capture processor 124 for an event involving receipt of an e-mail message by the user 112a can comprise the sender of the message, the recipients of the message, the time and date the message was received, the content of the message, and a conversation ID. A conversation ID can be used to associate messages that form a conversation and can be provided by the instant messenger application or can be generated by the capture processor 124. A conversation can be one or more messages between the user 112a and at least one other user until the user 112a logs out of or closes the instant messenger application or the instant messenger application is inactive for a certain period of time (for example, 30 minutes).

In the embodiment shown, the capture processor 124 comprises multiple capture components. For example, the capture processor 124 shown in FIG. 1 comprises a separate capture component for each client application in order to capture events associated with each application. The capture processor 124 shown also comprises a separate capture component that monitors overall network activity in order to capture event data associated with network activity, such as the receipt or sending of an instant messenger message. The capture processor 124 shown in FIG. 1 can also comprise a separate client device capture component that monitors overall client device performance data, such as processor load, idle time, disk access, the client applications in use, and the amount of memory available. The capture processor 124 shown in FIG. 1 also can comprise a separate capture component to monitor and capture keystrokes input by the user and a separate capture component to monitor and capture items, such as text, displayed on a display device associated with the client device 102. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schema can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger event sent by a user 112a can include a recipient or list of recipients, the time sent, the date sent, content of the message, and a conversation ID. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. An event schema can also contain lists of information, such as, for example, multiple recipient fields from an e-mail. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable." In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or e-mail. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an e-mail or pasting a sentence in a word processing document, closing an article, such as closing an instant messenger window or changing an e-mail message being viewed, loading, saving, opening, or viewing an article, such as a word processing document, web page, or e-mail, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102*a* was operational or because no capture component existed for a specific type of historical event at the time the event took place. Examples of historical events include the user's saved word processing documents, media files, presentation documents, calendar entries, spreadsheet documents, the e-mails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an e-mail application, to retrieve articles and other associated information. For example, the capture processor 124 can request that the web browser application obtain all viewed web pages by the user or request that the e-mail application obtain all e-mail messages associated with the user. These articles may not currently exist in memory 108 or on a storage device of the client device 102*a*. For example, the e-mail application may have to retrieve e-mails from a server device. In one embodiment, the search engine 122 indexes historical events.

In one embodiment, the capture processor 124 crawls a storage or other type of device associated with the client 102*a-n*, such as a hard drive, shared drive or other storage device, transitory device or other device that maintains data, or memory 162, and locates articles and associated data stored on the storage or other type of device. A "crawl" is defined by some or all of the following activities with respect to a particular device: (1) enumerating some or all articles on the device; (2) sequentially accessing some or all of the articles, reading the article content and metadata, and handing associated information to another component such as an indexing component; (3) analyzing the article content for enumerations of additional articles or devices; (4) ranking the order in which other articles and/or devices are enumerated; and (5) maintaining a record of what articles and/or devices have been previously accessed and/or analyzed to avoid repeating some or all of the previous activities described above. A crawl can locate one or more articles, i.e. a "lightweight" crawl could locate only one article. A storage device can include devices that store data or otherwise maintain data, such as hard drives, shared drives, or transitory devices.

The capture processor 124 can identify one or more storage locations on a storage device associated with a client 102*a-n*, such as a hard drive or other associated storage device. Each of the storage locations can include one or more articles, such as files, documents, webpages, e-mails, or messages. Storage locations can be identified by locating folders, lists, or other collections of articles on a storage device. Storage locations can also be identified by locating particular articles associated with particular events and/or characteristics. The capture processor 124 can identify these and other storage locations by accessing a storage device associated with a client 102*a-n*, such as a hard drive, and searching for these types of storage locations and/or articles.

In one embodiment, a capture processor 124 can generate a list of storage locations based on a previous search of a storage device, previously collected information from a crawl of the storage device, or input from or related to a user 112*a-n*. For example, utilizing information collected from a previous crawl, such as statistical information associated with articles and a storage device, the capture processor 124 can generate a list of relevant articles such as frequently accessed or recently accessed articles, and identify corresponding storage locations for relevant articles, including folders or directories.

The capture processor 124 can rank the storage locations based on events associated with articles, a plurality of types associated with articles, or a combination of events and plurality of types associated with articles. The events, plurality of types associated with articles, and combinations of events and plurality of types associated with articles can be assigned a weight or value, and a corresponding rank for the storage locations can be determined.

In another embodiment, the capture processor 124 can identify a plurality of types associated with articles stored in the storage locations. In one embodiment, the capture processor 124 can identify types of articles stored in the storage locations. Types of articles can be identified by analyzing statistical information and/or characteristics associated with articles and a storage device, or can be identified by analyzing the articles stored in the storage locations.

In another embodiment, the capture processor 124 can rank the storage locations based at least in part on the types of articles stored within the locations.

In another embodiment, the capture processor 124 can rank the storage locations based at least in part on events associated with the articles, and based at least in part on a plurality of types associated with the articles. As described above, the capture processor 124 can identify events associated with articles stored in the storage locations and can also identify a plurality of types of articles stored in the storage locations. As described above, each event can be assigned a weight or a value, and each of the types of articles can also be assigned a weight or value. Further, combinations of events and types of articles can be assigned a weight or value. Using events, types of articles and/or combinations of events and types of articles, corresponding articles and/or storage locations can be ranked accordingly.

In any instance, the capture processor 124 can crawl the storage locations based at least in part on the ranking. In this manner, the system 100 can initially crawl storage locations containing relevant articles on a storage device associated with a client device 102*a-n* such as a hard drive, and provide the relevant articles and other content from the storage locations for use in search results or for providing articles and other content for a home page.

In the embodiment shown in FIG. 1, events captured by the capture processor 124 are sent to the queue 126 in the form of an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126, or how detailed the events are that are sent (fewer or smaller events when the system is busy), or how frequently events are sent (events are sent less often when the system is busy or there are too many events waiting to be processed). The search engine 122 can use performance data to determine when it indexes various events and when and how often it issues implicit queries.

In one embodiment, the queue 126 holds the events and performance data until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a two- or three-priority queue where higher priority events are served before lower priority events, and other components may be able to specify the type of events they are interested in. Generally, real-time events can be given higher priority than historical events, and indexable events can be given higher priority than non-indexable real time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 shown contains an indexer 130, a query system 132, and a formatter 134. The query system 132 can retrieve all real-time events and performance data from the queue 126. The query system 132 can use performance data and real-time events to update the current user state and generate an implicit query. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

In one embodiment, when the indexer 130 receives an event, the indexer 130 can determine, from the event schema, terms (if any) associated with the event, location information associated with the event (if available), the time of the event (if available), images (if any) associated with the event, and/or any other information defining the event. The indexer 130 can also determine if the event relates to other events and associate the event with related events. For example, for a received instant messenger message event, the indexer can associate the message event with other message events from the same conversation. The messages from the same conversation can be associated with each other in a conversation object, which can be stored in the data store 140.

The indexer 130 can send and incorporate the terms, locations, and times, associated with the event in the index 142 of the data store 140. The event can be sent to the database 144 for storage and the content of the associated article and any associated images can be stored in the repository 146. The conversation object associated with e-mail messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's e-mails, word processing documents, and instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 formats the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including, for example, DLL exports, COM interface, VB, JAVA, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 shown includes a server executing a search engine application program, such as the Google™ search engine. In other embodiments, the server device 150 can comprise a related information server or an advertising server. Similar to the client devices 102a-n, the server device 150 shown can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 then can provide the result set to the client device 102a via the network 106. The result set can comprise one or more article identifiers. An article identifier may be, for example, a Uniform Resource Locator (URL), a file name, a link, an icon, a path for a local file, or anything else that identifies an article. In the embodiment shown, an article identifier comprises a URL associated with an article.

In one embodiment, the server device 150, or related device, has previously performed a crawl of the network 106 to locate articles, such as web pages, stored at other devices or systems connected to the network 106, and indexed the articles in memory 162 or on another data storage device.

It should be noted that other embodiments of the present invention may comprise systems having different architecture than that which is shown in FIG. 1. For example, in some other embodiments of the present invention, the client device 102a is a stand alone device that is not permanently coupled to a network. The system 100 shown in FIG. 1 is merely exemplary, and is used to explain the exemplary methods shown in FIGS. 2 through 4.

Processes

Various methods in accordance with embodiments of the present invention may be carried out. One exemplary method according to the present invention comprises identifying a plurality of storage locations each comprising a plurality of articles, ranking the plurality of storage locations based at least in part on events associated with the plurality of articles, and crawling the storage locations based at least in part on the ranking.

According to another embodiment, a plurality of storage locations is associated with at least one storage device.

According to another embodiment a plurality of storage locations is associated with a plurality of storage devices. According to another embodiment a plurality of storage locations comprises at least one of the following: a client side device, a local hard drive, a shared drive, a data storage device.

According to another embodiment, events associated with the plurality of articles comprise at least one of the following: user access of an article, user access of a file, user access of a directory associated with an article, user access of a particular type of article, user access of a particular type of file, saving an article to a directory, saving a file to a directory, saving an article to a folder, saving a file to a folder, accessing an article, accessing a file, saving an article, saving a file, opening an article, opening a file, receiving an e-mail from a particular sender, sending an e-mail to a particular recipient, receiving a message from a particular sender, and sending a message to a particular recipient.

According to another embodiment, events comprise event data that is obtained from at least one of the following: an operating system, a browser application program, an enabling/monitoring application program, a previous version of a search application program, and a previous version of an application program associated with a search engine application.

According to another embodiment, a plurality of articles comprises at least one of the following: a directory, a folder, a file, a webpage, e-mail, a message, and a file associated with an application program.

According to another embodiment, identifying a plurality of storage locations comprises at least one of the following: identifying a recently accessed file list, identifying a my favorites list, identifying a my documents folder, identifying a desktop folder, identifying a list of recently accessed files associated with an application program, identifying a folder of recent e-mails, identifying a folder of recent messages, and identifying a cached list of webpages.

According to another embodiment, identifying a plurality of storage locations comprises identifying events associated with the plurality of articles. According to another embodiment, events associated with the plurality of articles comprise at least one of the following: user access of an article, user access of a file, accessing an article, accessing a file, saving an article, saving a file, opening an article, and opening a file.

According to another embodiment, identifying a plurality of storage locations comprises identifying characteristics associated with the plurality of articles. According to another embodiment, characteristics associated with the plurality of articles comprises at least one of the following: file size, file type, file recency, a date/time of last access, a date/time of recent access, a date/time of last modification, a date/time of creation, a date, and a time.

According to another embodiment, a method can comprise identifying a plurality of types of the plurality of articles, wherein ranking the plurality of storage locations comprises ranking the storage locations based at least in part on the plurality of types of the plurality of articles. According to another embodiment, identifying a plurality of types of the plurality of articles comprises prioritizing each of the plurality of types, wherein ranking the storage locations based at least in part on the plurality of types comprises ranking the storage locations based at least in part on the prioritizing each of the plurality of types.

According to another embodiment, ranking the plurality of storage locations based at least in part on events associated with the plurality of articles comprises prioritizing the plurality of storage locations based on a frequency of the events.

According to another embodiment, ranking the plurality of storage locations based at least in part on events associated with the plurality of articles comprises prioritizing the plurality of storage locations based on a recency of the events.

According to another embodiment, crawling the storage locations based at least in part on the ranking comprises crawling a predefined number of the plurality of storage locations, wherein the ranking is prioritized from a highest frequency to a lower frequency.

According to another embodiment, crawling the storage locations based at least in part on the ranking comprises at least one of the following: crawling a predefined number of storage locations, crawling a predefined number of directories, crawling a top directory in a file hierarchy, crawling a predefined number of folders, crawling a predefined number of articles, crawling a predefined number of files, crawling a predefined number of indexable files, crawling for a predefined amount of time, and crawling to a predefined depth in a folder hierarchy starting from either a root or a predefined starting folder, or some combination thereof.

According to another embodiment, crawling the storage locations based at least in part on the ranking comprises identifying at least one duplicate set of the storage locations, and crawling one of the duplicate set of the storage locations.

According to another embodiment, crawling the storage locations based at least in part on the ranking comprises crawling at least some of the storage locations.

According to another embodiment, crawling the storage locations based at least in part on the ranking comprises prioritizing the crawling of at least some of the storage locations based at least in part on the ranking.

Another exemplary method according to the present invention comprises identifying a plurality of storage locations each comprising a plurality of articles, identifying a plurality of types of the plurality of articles, ranking the plurality of storage locations based at least in part on the plurality of types of the plurality of articles, and crawling the storage locations based at least in part on the ranking.

According to another embodiment, a plurality of storage locations is associated with at least one storage device. According to another embodiment, a plurality of storage locations is associated with a plurality of storage devices.

According to another embodiment, a plurality of storage locations comprises at least one of the following: a client side device, a local hard drive, a shared drive, a data storage device.

According to another embodiment, the plurality of types of the plurality of articles comprise at least one of the following: a file type, a document type, an e-mail type, a message type, and a website domain.

According to another embodiment, the plurality of articles comprises at least one of the following: a directory, a folder, a file, a webpage, e-mail, a message, and a file associated with an application program.

According to another embodiment, identifying a plurality of storage locations comprises at least one of the following: identifying a recently accessed file list, identifying a my favorites list, identifying a my documents folder, identifying a desktop folder, identifying a list of recently accessed files associated with an application program, identifying a folder of recent e-mails, identifying a folder of recent messages, and identifying a cached list of webpages.

According to another embodiment, identifying a plurality of storage locations comprises identifying events associated with the plurality of articles.

According to another embodiment, the events comprise event data that is obtained from at least one of the following: an operating system, a browser application program, an enabling/monitoring application program, a previous version of a search application program, and a previous version of an application program associated with a search engine application.

According to another embodiment, identifying a plurality of storage locations comprises identifying characteristics associated with the plurality of articles. According to another embodiment, characteristics associated with the plurality of articles comprises at least one of the following: file size, file type, file recency, a date/time of last access, a date/time of recent access, a date/time of last modification, a date/time of creation, a date, and a time.

According to another embodiment, ranking the plurality of storage locations based at least in part on the plurality of types of the plurality of articles comprises ranking the plurality of storage locations based at least in part on events associated with the plurality of articles.

According to another embodiment, ranking the plurality of storage locations based at least in part on the plurality of types of the plurality of articles comprises prioritizing the plurality of storage locations based at least in part on a frequency of events associated with the plurality of articles.

According to another embodiment, ranking the plurality of storage locations based at least in part on the plurality of types of the plurality of articles comprises prioritizing the plurality of storage locations based on a recency of events associated with the plurality of articles.

According to another embodiment, crawling the storage locations based at least in part on the ranking comprises crawling a predefined number of the plurality of storage locations, wherein the ranking is prioritized from a highest frequency of events to a lower frequency of events.

According to another embodiment, crawling the storage locations based at least in part on the ranking comprises at least one of the following: crawling a predefined number of storage locations, crawling a predefined number of directories, crawling a top directory in a file hierarchy, crawling a predefined number of folders, crawling a predefined number of articles, crawling a predefined number of files, crawling a predefined number of indexable files, crawling for a predefined amount of time, and crawling to a predefined depth in a folder hierarchy starting from either a root or a predefined starting folder, or some combination thereof.

According to another embodiment, crawling the storage locations based at least in part on the ranking comprises identifying at least one duplicate set of the storage locations, and crawling one of the duplicate set of the storage locations.

According to another embodiment, crawling the storage locations based at least in part on the ranking comprises crawling at least some of the storage locations.

According to another embodiment, crawling the storage locations based at least in part on the ranking comprises prioritizing the crawling of at least some of the storage locations based at least in part on the ranking.

Another exemplary method according to the present invention comprises identifying a plurality of storage locations each comprising a plurality of articles, identifying a plurality of types of the plurality of articles, ranking the plurality of storage locations based at least in part on the plurality of types of the plurality of articles and based at least in part on events associated with the plurality of articles, and crawling the storage locations based at least in part on the ranking.

Figure 2:
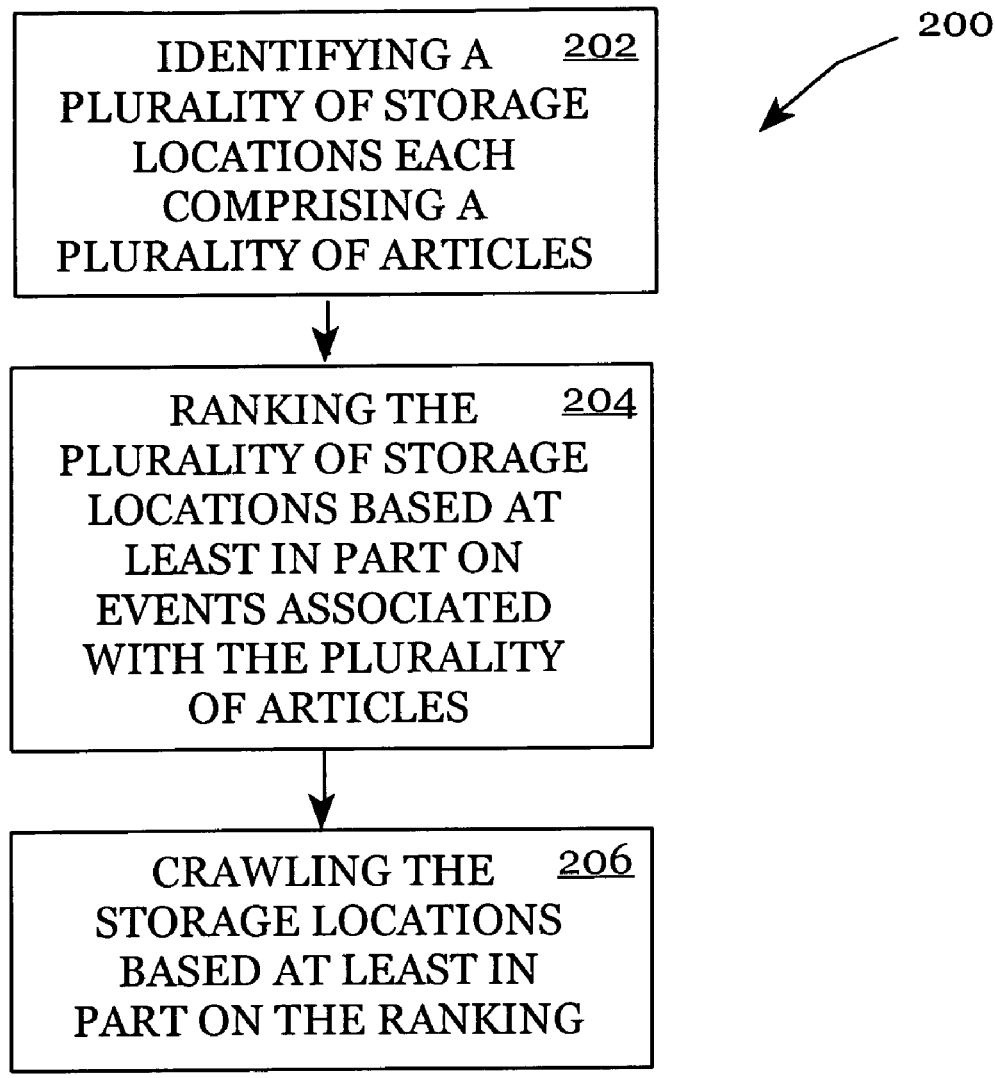
FIG. 2 illustrates a flow diagram of a method in accordance with one embodiment of the present invention.

FIG. 2 illustrates an exemplary method 200 that provides a method for prioritizing a crawl. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

Referring to FIG. 2, the example method 200 begins at block 202.

In block 202, a plurality of storage locations each comprising a plurality of articles is identified. In the embodiment shown in FIG. 2, a capture processor 124 can identify storage locations of articles stored on a storage device associated with a client 112a-n. Storage locations can be identified by locating folders, lists, or other collections of frequently used and/or frequently accessed articles, files, documents, webpages, e-mails and/or messages on the storage device. The capture processor 124 can identify these and other storage locations by accessing a storage device associated with a client 102a-n, such as a hard drive, and searching for these types of storage locations.

By way of example, a capture processor 124 can identify and access a "my favorites" folder on a hard drive associated with a client device 112a, and identify the files in the "my favorites" folder. Files in the "my favorite" folder or other similar types of folders can lead to directories and folders containing relevant content for a crawl. The capture processor 124 can then determine a storage location associated with each of the files in the "my favorites" folder. The storage location can include a respective directory and folder where each of the files in the "my favorites" folder are stored on the hard drive. In this manner, the storage locations for the files in the "my favorites" folder can be identified.

In another example, a word processing capture component can identify and access a "recently accessed" folder on a hard drive associated with a client device 112a-n. The word processing capture component can identify the files in the "recently accessed" folder. Files in the "recently accessed" folder or other similar types of folders can lead to directories and folders containing relevant content for a crawl. The word processing capture component can then determine a storage location associated with each of the recently accessed word processing files in the "recently accessed" folder. The storage location can include a respective directory and folder where each of the recently accessed word processing files in the "recently accessed" folder are stored on the hard drive. In this manner, the storage locations for the recently accessed word processing files in the "recently accessed" folder can be identified.

In another example, a capture component can access a "history" folder on a hard drive associated with a client device 112a-n, and identify the webpages recently visited by a particular user. For instance, the capture component can identify articles associated with a web browser application program by identifying webpages in a "history" folder. Webpages in the "history" folder or other similar types of folders can lead to directories and folders containing relevant content for a crawl. The capture processor can then determine a storage location associated with each of the webpages recently visited by a particular user. The storage location can include the Internet or network addresses of the webpages such as the URLs of each of the webpage addresses associated with the webpages recently visited by a particular user. In this manner, storage locations for the webpages recently visited by a particular user can be identified.

Different operating systems (OS) can have different sets of relatively important storage locations such as particular folders for storing particular types of articles. For example, in one version of the Microsoft Windows™ OS, there can exist folders such as "My Videos," "My Music," "My Pictures," etc. In a version of the Macintosh OS, there can exist folders such as "Music," "Pictures," "Movies," "Desktop, "Documents," etc.

Storage locations can also be identified by locating particular articles associated with particular events. The capture processor 124 can identify these and other storage locations by accessing a storage device associated with a client 102a-n, such as a hard drive, and searching for these types of articles.

In one example, files can be weighted based on events such as frequency of user access wherein frequently accessed files can be weighted relatively more than less frequently accessed files. Other events can be weighted according to relevance of the particular event to user interest in a particular article. In any instance, the relatively heavier weighted files can be utilized by the capture processor to identify the corresponding storage locations for subsequent processing.

In another example, when the capture processor 124 identifies storage locations on a storage device associated with a client 102a-n, such as a "my favorites" folder, "my documents" folder, and recently accessed list of word processing documents, the capture processor 124 can also identify events associated with articles in the storage locations, such as the frequency of access for each article in the storage locations. The capture processor 124 can determine, for example, the most frequently accessed files in particular storage locations of interest, such as the most frequently accessed files in the "my favorites" folder, "my documents" folder, and recently accessed list of word processing documents. Utilizing the events associated with the files, such as the frequency of access for each of the files, the capture processor 124 can identify frequently accessed files in the storage locations of interest. The corresponding storage locations of the frequently accessed files, including the corresponding directories and folders, can be stored for subsequent processing by the capture processor 124. In this manner, the storage locations containing relevant content such as frequently accessed files or articles can be identified for subsequent processing. Other events associated with articles can be utilized in accordance with other embodiments of the invention.

In another example, the capture processor 124 can identify storage locations by locating articles associated with particular events such as recent user access or use. Recently used and/or accessed articles such as files, documents, webpages, e-mails, or messages on a storage device associated with a client 102a-n can lead to relevant content in storage locations on the storage device. When such articles are identified, the capture processor 124 can then identify the corresponding location of such articles, files, documents, webpages, e-mails, or messages on the storage device.

In another example, the capture processor 124 can identify relevant articles and storage locations by analyzing previously collected statistical information from a crawl of the storage device associated with a client 102a-n. For instance, the capture processor 124 can determine frequently used and/or frequently accessed articles based on statistical information from a previous search of the storage device, or based on input from or related to a user 112a-n. In any instance, the capture processor 124 can generate a list of storage locations based in part on a previous search of a storage device, based in part on previously collected information from a crawl of the storage device, or based in part on input from or related to a user 112a-n.

In another example, utilizing information collected from a previous crawl, such as statistical information associated with articles and a storage device, the capture processor 124 can generate a list of frequently used and/or frequently accessed articles, and identify corresponding storage locations for such articles, including associated folders or directories.

Storage locations can also be identified by locating particular articles associated with particular characteristics or types of articles. The capture processor 124 can identify these and other storage locations by accessing a storage device associated with a client 102a-n, such as a hard drive, and searching for these types of articles.

In one example, a word processing capture component can identify word processing application-type files on a storage device associated with a client device 102a-n. The word processing capture component can identify the storage locations associated with the word processing application-type files, including associated directories and folders. Other types of articles can be utilized to identify storage locations in accordance with other embodiments of the invention, In another example, a word processing capture component can identify a particular type of word processing application file on a storage device associated with a client device 102a-n, such as ".doc"-type files. The word processing capture component can identify the storage locations associated with the ".doc"-type word processing application files, including associated directories and folders. Other types of articles can be utilized to identify storage locations in accordance with other embodiments of the invention, Storage locations can also be identified by locating particular articles associated with combinations of events and characteristics or types of articles. For example, a capture processor 124 can identify frequently used ".doc"-type word processing application files on a storage device associated with a client 102a-n. The capture processor 124 can then identify the respective storage locations of such files, including directories and folders.

A capture processor 124 can identify storage locations when the search engine 122 becomes operational, on a periodic basis, upon the passage of a predetermined amount of time, inactivity by a user, or in response to certain conditions. In one embodiment, identifying a plurality of storage locations is performed by a crawl capture component of the capture processor 124.

In another embodiment, identifying a plurality of storage locations can be triggered or otherwise initiated by a separate component of the search system. For instance, this may be another capture component of the capture processor 124.

In another embodiment, identifying a plurality of storage locations can be performed by multiple capture components associated with respective applications of the client device, such as the word processing capture component, spreadsheet capture component, e-mail capture component, and presentation capture component.

Examples of storage locations associated with articles stored on a storage device associated with a client 102a-n can include, but are not limited to, directories on a hard drive associated with client 102a, shared directories on a shared drive accessible by the client 102a via a local area network or network 106, a directory, a subdirectory, a root directory, a parent directory, a folder, a "my favorites" folder, a desktop folder, a "my documents" folder, a path, a file location, a file name, a database location, a memory location, a drive location, a website, a URL, a network address, and any other suitable location for storing an article. Examples of a storage device accessible by or otherwise associated with a client 102a-n include, but are not limited to, a hard drive, a disk drive, a shared drive, a memory device, a database, a removable device, a network, an intranet, a drive accessible by the client device via a local area network, and a drive accessible by the client device via a network.

Block 202 is followed by block 204, in which the plurality of storage locations based at least in part on events associated with the plurality of articles is ranked. In the embodiment shown in FIG. 2, the capture processor 124 can rank the plurality of storage locations based at least in part on events associated with the plurality of articles. Various events associated with articles have been previously described above in block 202. Events can be weighted or otherwise valued according to the relevance each event may have for indicating user interest in a particular article associated with the event. For example, an event that involves direct access (editing or saving) of an article by a user 112a-n can be weighted relatively higher than an event that involves indirect access (viewing) of an article by a user 112a-n, which can be weighted relatively higher than an event that involves only system access (archiving) of an article. In this manner, articles associated with particularly relevant events can be weighted relatively higher or greater than articles associated with less relevant events. Utilizing weights or values associated with events, the capture processor 124 can determine a total weight or value for the corresponding articles, and then determine a rank or ranking for the storage locations associated with the articles. A rank or ranking can include, but is not limited to, a hierarchical order, a numeric score, a weight, a weighted value, a priority, and a prioritized list.

In one embodiment, the capture processor 124 can rank storage locations based on one particular type of event associated with the articles. For example, the capture processor 124 can determine the frequency each article has been accessed by a user 112a-n, and then rank the corresponding storage locations based on the frequency each article has been accessed by a user. In this example, articles that have been accessed with greater frequency can be ranked relatively higher than articles that have been accessed with lesser frequency.

In another embodiment, the capture processor 124 can rank storage locations based on two or more particular types of events associated with the articles. For example, the capture processor 124 can determine the frequency each article has been accessed by a user 112a-n, and then rank the corresponding storage locations based on the frequency each article has been accessed by a user 112a-n, and based on the recency each article has been accessed by a user 112a-n. In this example, articles that have been accessed with greater frequency can be ranked relatively higher than articles that have been accessed with lesser frequency, and articles that have been accessed more recently can be ranked relatively higher than articles that have been accessed less recently. In other embodiments, greater or fewer numbers and/or other types of events can be evaluated in accordance with embodiments of the invention.

The capture processor 124 can rank any number of storage locations depending on a predefined number, user input, time, the number of storage locations on a particular storage device, or the number of articles on a particular storage device. For example, a predefined number such as "20" can be preselected, and the capture processor 124 can rank the predefined number of storage locations. In another example, a user 112a-n can select any number of storage locations, such as selecting "50" via an input device associated with a client device 112a-n. The capture processor 124 can rank the user input number of storage devices. By way of another example, a capture processor 124 can rank any portion of the total number of storage locations on a particular storage device, such as ranking all of the storage locations for articles contained in particular folders such as a "my favorites" folder, a "my documents" folder, a desktop folder, and/or a "recently accessed" folder. Other embodiments can rank greater or fewer numbers of storage locations in accordance with embodiments of the invention.

In any instance, when a list of ranked storage locations to be crawled is identified or otherwise generated, the capture processor 124 can send an event comprising storage location data, including the folder and directory associated with an article in the storage location, to the queue 126. The indexer 130 can request the storage location data from the queue 126, and can process and store the storage location data in the data store 140. The storage location data can be stored in the database 144 or the repository 146 for subsequent retrieval.

An event and associated event data can be obtained from, or otherwise collected from, an operating system (OS), a browser application program, or an enabling/monitoring application program. In one embodiment, an event and associated event data can be obtained from a previous version of an application program, such as a search engine application program or an application program associated with a search engine application program, if a particular storage device has been previously crawled.

For example, a capture processor 124 or word processing capture component can rank a plurality of storage locations based at least in part on events associated with the plurality of articles, such as ranking directories on a hard drive based in part on the number of times a user accessed word processing files stored on the hard drive. The capture processor 124 or word processing capture component can rank the storage locations associated with the word processing files such as based on the frequency each file was accessed by a particular user. Further, the capture processor 124 or word processing capture component can also rank the storage locations based on a combination of other events.

By way of another example, the capture processor 124 can rank the directories associated with the top 20 most frequently accessed files based at least in part on events associated with the articles, such as the number of times each of the top 20 most frequently accessed files has been accessed by a particular user. In this example, a directory associated with a file that has been accessed 100 times by a particular user can be ranked relatively higher than a directory associated with a file that has been accessed 75 times by the particular user, which can be ranked relatively higher than a directory associated with a file that has been accessed 50 times by the particular user. Other types of events can be used to rank storage locations in accordance with other embodiments of the invention.

By way of yet another example, the word processing capture component 124 can rank the directories associated with the 20 most frequently accessed word processing files based at least in part on events associated with the articles, such as the number of times each of the top 20 most frequently accessed files has been accessed by a particular user. In this example, a directory associated with a word processing file that has been accessed 100 times by a particular user can be ranked relatively higher than a directory associated with a word processing file that has been accessed 75 times by the particular user, which can be ranked relatively higher than a directory associated with a word processing file that has been accessed 50 times by the particular user. Other types of events can be used to rank storage locations in accordance with other embodiments of the invention.

By way of still another example, the capture processor 124 can rank the network addresses or URLs associated with the last 100 webpages visited by a particular user based at least in part on events associated with the webpages, such as the number of times each of the last 100 webpages was visited by a particular user. In this example, a network address or URL associated with a webpage that has been accessed 10 times by a particular user can be ranked relatively higher than a network address or URL associated with a webpage that has been accessed 9 times by the particular user, which can be ranked relatively higher than a network address or URL associated with a webpage that has been accessed 8 times by the particular user. Other types of events can be used to rank storage locations in accordance with other embodiments of the invention.

Block 204 is followed by block 206, in which the storage locations are crawled based at least in part on the ranking. In the embodiment shown in FIG. 2, storage locations can be crawled based at least in part on the ranking. A crawl can be performed when the search engine 122 becomes operational, on a periodic basis, upon the passage of a predetermined amount of time, inactivity by a user, or in response to certain conditions. The crawl can be performed by the capture processor 124. In one embodiment, the crawl is performed by a crawl capture component of the capture processor 124.

In another embodiment, the crawl can be triggered or otherwise initiated by a separate component of the search system. For instance, this may be another capture component of the capture processor 124.

In another embodiment, the crawl can be performed by multiple capture components associated with respective applications of the client device, such as the word processing capture component, spreadsheet capture component, e-mail capture component, and presentation capture component.

Furthermore in the example shown in FIG. 2, during the crawl, the capture processor 124 can locate articles stored on a storage device associated with a client, such as a hard drive associated with client 102*a*, or a shared drive accessible by the client 102*a* via a local area network or network 106. Other examples of a device accessible by a client 102*a* include, but are not limited to, a removable device, a network, an intranet, a drive accessible by the client device via a local area network, a drive accessible by the client device via a network.

The capture processor 124 can determine if each article located has previously been captured or if the article should be captured. Whether the article has changed can be an indication to capture the event. During the crawl, the capture processor 124, or respective capture component, can determine changes to an article. A change can include, but is not limited to, a modification to the article, addition of keystrokes to the article, new location of the article, deletion of the article, and changing of the article's metadata or information, including information in additional streams associated with the article, for example, on applicable operating systems. When an article is captured in a crawl, the capture processor 124 can send an event comprising event data to the queue 126. The indexer 130 can request the event from the queue 126, and can process and store the event in the data store 140. The event can be stored in the database 144 for storage and the associated article can be stored in the repository 146.

By way of continuing an example provided above, a capture processor 124 as described in FIG. 2 can crawl directories associated with the top 20 most frequently accessed files on a hard drive associated with the client device 102*a*. Based at least in part on events associated with the top 20 most frequently accessed files, the capture processor 124 can rank the directories in a hierarchical order, such as ranking the directory associated with the most frequently accessed file as first or number "1," ranking the directory associated with the second most frequently accessed file as second or number "2," etc. Utilizing the rank of each directory to crawl the directories in a hierarchical order, the capture processor 124 can capture some or all of the files in each of the directories associated with the top 20 most frequently accessed files. In this manner, the directory containing the most frequently accessed file can be crawled first, and the remaining directories containing the other most frequently accessed files can be crawled according to the hierarchical order. Some or all of the files in these directories can be captured and utilized in a search result.

By way of continuing another example provided above, a word processing capture component as described in FIG. 2 can crawl directories associated with the top 20 most frequently accessed word processing files on a hard drive associated with the client device 102a. Based at least in part on events associated with the top 20 most frequently word processing accessed files, the word processing capture component can rank the directories in a hierarchical order, such as ranking the directory associated with the most frequently accessed word processing file as first or number "1," ranking the directory associated with the second most frequently accessed word processing file as second or number "2," etc. Utilizing the rank of each directory to crawl the directories in a hierarchical order, the word processing capture component can capture some or all of the files in each of the directories associated with the top 20 most frequently accessed word processing files. In this manner, the directory containing the most frequently accessed word processing file can be crawled first, and the remaining directories containing the other most frequently accessed word processing files can be crawled according to the hierarchical order. Some or all of the word processing files in these directories can be captured and utilized in a search result.

By way of continuing yet another example provided above, a capture processor 124 can crawl network addresses or URLs stored on a hard drive associated with the client device 102, wherein the network addresses or URLs are associated with the last 100 webpages visited by a particular user. Based at least in part on events associated with the webpages, such as the number of times each of the last 100 webpages was visited by a particular user, the capture processor 124 can rank the webpages in a hierarchical order, such as ranking the most frequently visited webpage as first or number "1," ranking the second most frequently visited webpage as second or number "2," etc. Utilizing the rank of each webpage to crawl the network addresses or URLs associated with the respective webpages in a hierarchical order, the capture processor 124 can capture some or all of the articles at each of the last 100 webpages visited. In this manner, the most frequently visited webpages can be crawled first, and the other remaining frequently visited webpages can be crawled according to the hierarchical order. Some or all of the articles at these webpages can be captured and utilized in a search result.

In one embodiment, various parameters of a crawl of storage locations can be defined. For example, a predefined number of storage locations can be crawled, such as crawling 20 storage locations such as the 20 directories containing the 20 most frequently accessed files. By way of another example, a predefined number of directories and/or subdirectories can be crawled, such crawling a top directory in file hierarchy. In another example, a predefined number of folders can be crawled, such as crawling 100 folders containing the 100 most recently accessed word processing files, spreadsheet files, graphics files, or e-mails. In yet another example, a predefined number of files can be crawled, such as crawling the 1000 largest word processing files, or crawling 5000 files regardless of type. By way of another example, a predefined amount of time can be set for a crawl, such as crawling for 1 minute, or crawling for 1 minute every hour. The above parameters can be utilized by a capture processor 124 or other capture component, either individually or in combination with each other, or with other parameters in accordance with other embodiments of the invention.

In another embodiment, a capture processor 124 or other capture component can, prior to crawling a storage location, identify at least one duplicate set of storage locations, and crawl one of the duplicate set of the storage locations. By of example, a particular directory can be a sub-tree of multiple directories. The capture processor 124 or other capture component can recognize these instances, and can repress crawling the directory more than once such that processing time can be conserved and efficiently utilized.

Some or all of the above examples and associated methods can provide more relevant information to use in subsequent ranking and/or categorization of articles. In the embodiment shown in FIG. 2, the capture processor 124 can transmit the collected articles and other information to the database 144, or other data storage device for storage and subsequent retrieval. In one embodiment, the capture processor 124 can include the collected articles and other information with event data when compiling an event. In another example, a word processing capture component can transmit the collected articles and other information for word processing documents to be stored in the database 144. The search engine 122 can utilize some or all of the collected articles and/or other information in ranking or otherwise providing articles in response to a search. In another embodiment, the search engine 122 can utilize some or all of the collected articles and/or other information for selecting relevant articles for a home page. In either instance, the search engine 122 can retrieve some or all of the collected articles and/or other information from the database 144 and can utilize the collected articles and/or other information in an algorithm for ranking articles in a search result, for selecting articles for a home page, for deciding a device to crawl next, determining a frequency to re-crawl, or any combination thereof. In another example, some or all of the collected articles and/or other information can be output to a user for display. The search engine 122 can call to the display processor 128 to output some or all of the collected articles and/or other information for viewing by a user 112a-n with a display interface associated with a client device 102a-n. Some or all of the collected articles and/or other information can be retrieved from the database 144, and output to the display interface for viewing.

In block 206, the method 200 ends.

Figure 3:
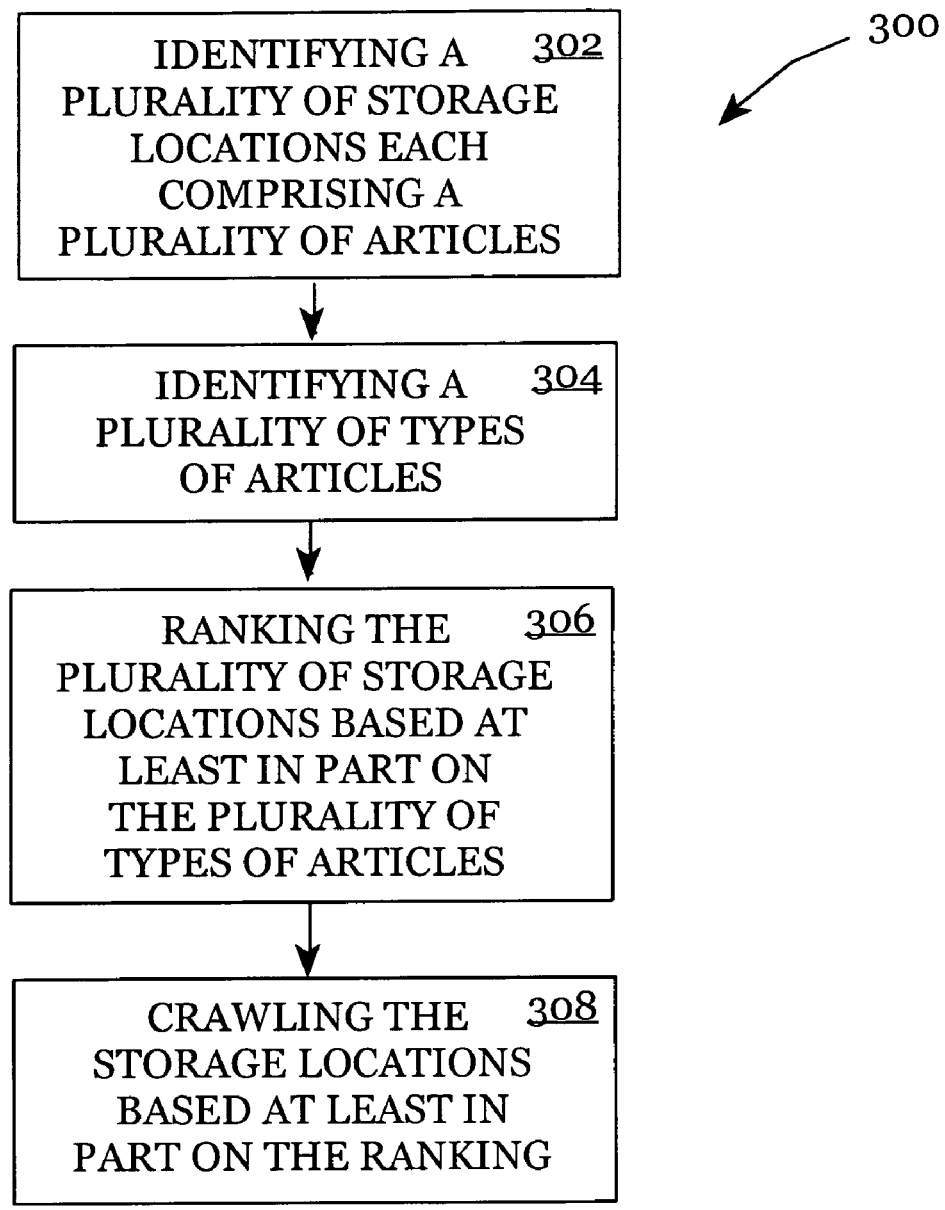
FIG. 3 illustrates a flow diagram of another method in accordance with one embodiment of the present invention.

FIG. 3 illustrates an exemplary method 300 that provides another method for prioritizing a crawl. This exemplary method is provided by way of example, as there are a variety of ways to carry out methods according to the present invention. The method 300 shown in FIG. 3 can be executed or otherwise performed by any of various systems. The method 300 is described below as carried out by the system 100 shown in FIG. 1 by way of example, and various elements of the system 100 are referenced in explaining the example method of FIG. 3.

The example method 300 begins at block 302.

In block 302, a plurality of storage locations each comprising a plurality of articles is identified. Similar to the embodiment shown and described above in block 202 of FIG. 2, the capture processor 124 of the embodiment shown in FIG. 3 can identify storage locations of articles stored on a storage device associated with a client device 112a-n.

Block 302 is followed by block 304, in which a plurality of types of the plurality of articles is identified. Various types of articles can be identified by a capture processor 124 by determining characteristics associated with the articles of interest including, but not limited to, file type, file size, file recency, a date/time of last access, a date/time of recent access, a date/time of last modification, a date/time of creation, a date, and a time. Other types of articles can be identified in accordance with other embodiments of the invention.

In some instances, characteristics associated with articles of interest can be dependent on a particular type of operating system (OS) such as Microsoft Windows™ or Apple Macintosh™ OS. By way of example, in a version of the Microsoft Windows™ OS, characteristics associated with articles of interest can include, but are not limited to, date/time of last access, a date/time of recent access, a date/time of last modification, and date/time of creation.

For example, articles such as a documents can be distinguished by application programs the documents are associated with. Various application programs such as word processing, spreadsheet, presentation, and graphics application programs can generate different types of articles such as files with different suffixes. In another example, a particular type of application program, such as word processing programs, can generate different types of articles depending on the manufacturer or distributor of the word processing program. Different types of word processing programs can generate different types of articles such as files with different suffixes. In yet another example, types of articles can be distinguished by file size, such as a predefined ranges of file size distinguishing between large, medium, and small files. In another example, types of articles can be distinguished by a time or date associated with the article, such as files created within the last week, month, year, or any other period of time. In this manner, recently created or saved articles, for example, can be identified.

In one embodiment, a word processing capture component can identify one or more particular types of articles associated with various word processing application programs, such as distinguishing between different types of word processing files by their respective suffixes ".wpd," ".doc," and ".txt." The word processing capture processor can then determine a storage location associated with each type of word processing files, such as ".doc"-type files. In any instance, the storage location can include the directory and folder where each type of word processing files are stored. In this manner, the storage locations for each type of word processing files can be identified.

By way of another example, a capture component can identify particular types of webpages in a "history" or "recently viewed" folder. For instance, the capture component can identify, determine, or otherwise distinguish between, any type of webpage in a "history" or "recently viewed" folder, such as ".com"-type, ".org"-type, and ".net"-type webpages. In one embodiment, the capture component can determine the types of webpages visited by a particular user and stored in a "history" folder, such as which of the webpages are ".com"-type webpages.

Block 304 is followed by block 306, in which the plurality of storage locations based at least in part on the plurality of types of articles is ranked. In the embodiment shown in FIG. 3, the capture processor 124 can rank the plurality of storage locations based at least in part on the plurality of types of articles. Various types of articles have been previously described above in block 304. The types associated with particular articles can be weighted or otherwise valued according to the relevance each type of article may have for indicating user interest in a particular type of article. For example, a word processing application program-type article that can be accessed directly by a user 112*a-n* can be weighted relatively higher than a dynamic link library (DLL)-type article which is rarely accessed directly by a user 112*a-n*. In another example, recently created articles such as files created within the past year can be weighted relatively higher than articles created between a year and two years ago, which can be weighted relatively higher than articles created over two years ago. In this manner, particularly relevant types of articles can be weighted relatively higher or greater than less relevant types of articles. Utilizing weights or values associated with types of articles, the capture processor 124 can determine a total weight or value for the corresponding articles, and then determine a rank or ranking for the storage locations associated with the articles. A rank or ranking can include, but is not limited to, a hierarchical order, a numeric score, a weight, a weighted value, a priority, and a prioritized list.

For example in FIG. 3, a capture processor 124 or word processing capture component can rank a plurality of storage locations based at least in part on the plurality of types of articles, such as ranking directories on a hard drive based in part on the number of ".doc"-type word processing files versus the number of ".txt"-type word processing files. The capture processor 124 or word processing capture component can also rank the storage locations associated with one particular type of article, such as ".doc"-type word processing files, based on the frequency the particular type of file is present in a set or group of interest. Further, the capture processor 124 or word processing capture component can also rank the storage locations based on weighting a combination of other types of articles. For instance, the capture processor 124 or word processing capture component can rank the storage locations associated with the frequency of ".doc"-type word processing files in those locations in a first ranking order, then rank the storage locations associated with the frequency of another type of word processing files in those locations, such as ".txt"-type files in a second ranking order, and then rank the storage locations associated with the frequency of another type of word processing files in those locations, such as ".wpd"-type files in a third ranking order. In some instances, particular types of articles, such as text-type documents, can be batch processed. In one example, text-type documents such as ".doc," ".dot," ".txt," and ".rtf"-type files can be separately identified, but ranked collectively as a single batch or group. The single batch or group can then be ranked or otherwise prioritized against other batches, groups, or types of articles, files, or documents. Other rankings, types of articles, articles, weighting of rankings, types of articles, and/or articles can exist in other embodiments of the invention.

By way of another example, the capture processor 124 can rank storage locations such as directories on a storage device based at least in part on the plurality of types of articles in the directories, such as the number of ".doc"-type word processing files in a recently accessed word processing application program file folder. In this example, ".doc"-type files may be the most prevalent with 16 of the 20 recently accessed word processing application program files, while only 3 of the 20 recently accessed word processing application program files are ".txt"-type files, and 1 of the 20 recently accessed files is a ".wpd"-type file. Directories associated with each ".doc"-type file can be ranked relatively higher than directories associated with the ".txt"-type files that are less prevalent in the 20 recently accessed word processing application program files, which can be ranked relatively higher than a directory associated with a ".wpd"-type file that is even less prevalent in the 20 recently accessed word processing application program files. Other combinations of types of articles can be used to rank storage locations in accordance with other embodiments of the invention.

By way of another example, the capture processor 124 can rank the network addresses or URLs associated with the 100 webpages recently visited by a particular user based at least in part on the types of webpages, such as the number of ".com"-type webpages versus the number of ".org"-type webpages. The capture processor 124 can also rank the storage locations associated with one particular type of article, such as ".com"-type webpages, based on the frequency of the type of webpage in a set or group of interest. Further, the capture processor 124 can also rank the storage locations based on weighting a combination of other types of articles. For instance, the capture processor 124 can rank the storage locations associated with the frequency of ".com"-type webpages in those locations in a first ranking order, can rank the storage locations associated with the frequency of ".org"-type webpages in those locations in a second ranking order, and can rank the storage locations associated with the frequency of ".net"-type webpages in those locations in a third ranking order. Further, the capture processor 124 can also rank the storage locations based on any combination of other types of articles. Other rankings, types of articles, articles, weighting of rankings, types of articles, and/or articles can exist in other embodiments of the invention.

Block 306 is followed by block 308, in which the storage locations are crawled based at least in part on the ranking. Similar to the embodiment described and shown above in 206 of FIG. 2, the capture processor 124 of the embodiment shown in FIG. 3 can crawl storage locations based at least in part on the ranking. As described above in block 206, various parameters of a crawl of storage locations can be defined.

By way of example, a capture processor 124 as described in FIG. 3 can crawl directories associated with particular types of articles, such as ".doc"-type and ".txt"-type files, in the recently accessed word processing application program file folder on a hard drive associated with the client device 102a. Based at least in part on the types of articles in the recently accessed word processing application program file folder, the capture processor 124 can rank the directories in a hierarchical order, such as ranking a directory associated with ".doc"-type files as first or number "1," ranking the directory associated with the second most prevalent type of file as second or number "2," etc. Utilizing the rank of each directory to crawl the directories in a hierarchical order, the capture processor 124 can capture some or all of the files in each of the directories associated with the recently accessed word processing application program files. In this manner, the directory containing a particular type of file that is among the most frequently accessed files can be crawled first, and the remaining directories containing other types of files among the most frequently accessed files can be crawled according to the hierarchical order. Some or all of the files in these directories can be captured and utilized in a search result.

By way of another example, a capture processor 124 can crawl network addresses or URLs stored on a hard drive associated with the client device 102, wherein the network addresses or URLs are associated with the recently visited webpages of a particular type, such as ".com"-type webpages, visited by a particular user. Based at least in part on the types of articles, such as the number of ".com"-type webpages, the capture processor 124 can rank the ".com"-type webpages in a hierarchical order, such as ranking the most prevalent type of webpages, ".com"-type webpages, as first or number "1," ranking the second most prevalent type of webpages, ".org"-type webpages, as second or number "2," etc. Utilizing the rank of each type of webpage to crawl the network addresses or URLs associated with the respective webpages in a hierarchical order, the capture processor 124 can capture some or all of the articles at each of the ".com"-type webpages recently visited. In this manner, the most prevalent type of webpages recently visited, ".com"-type webpages, can be crawled first, and the other remaining prevalent types of webpages recently visited, ".org"-type webpages, etc. can be crawled according to the hierarchical order. Some or all of the articles at these webpages can be captured and utilized in a search result.

Figure 4:
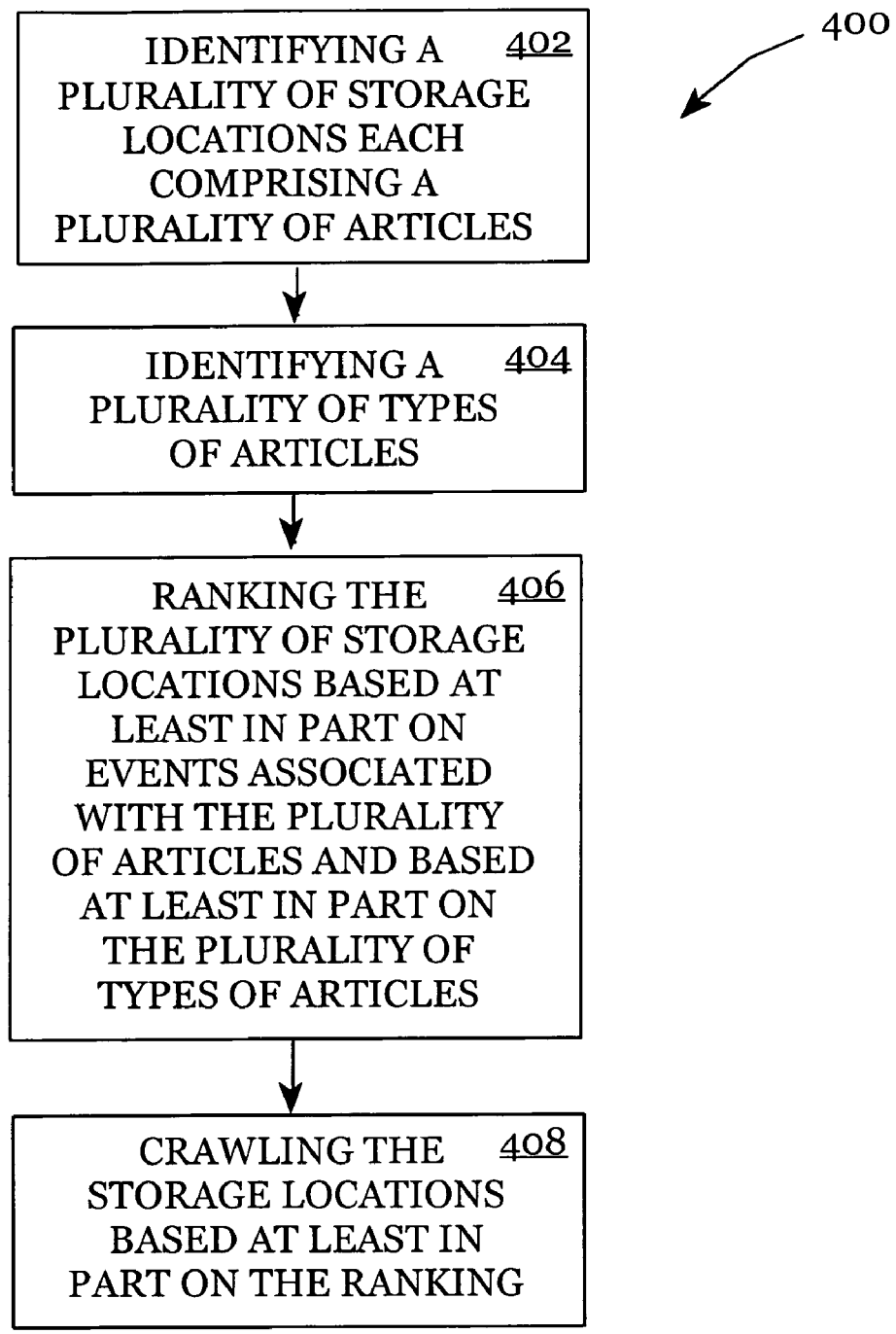
FIG. 4 illustrates a flow diagram of another method in accordance with one embodiment of the present invention.

FIG. 4 illustrates an exemplary method 400 that provides another method for prioritizing a crawl. This exemplary method is provided by way of example, as there are a variety of ways to carry out methods according to the present invention. The method 400 shown in FIG. 4 can be executed or otherwise performed by any of various systems. The method 400 is described below as carried out by the system 100 shown in FIG. 1 by way of example, and various elements of the system 100 are referenced in explaining the example method of FIG. 4.

The example method 400 begins at block 402.

In block 402, a plurality of storage locations each comprising a plurality of articles is identified. Similar to the embodiment shown and described above in block 202 of FIG. 2 and in block 302 of FIG. 3, the capture processor 124 of the embodiment shown in FIG. 4 can identify storage locations of articles stored on a device associated with a client device.

Block 402 is followed by block 404, in which a plurality of types of the plurality of articles is identified, similar to the embodiment described and shown above in block 304 in FIG. 3.

Block 404 is followed by block 406, in which the plurality of storage locations is ranked based at least in part on events associated with the plurality of articles, and based at least in part on the plurality of types of the plurality of articles. In the embodiment shown in FIG. 4, the capture processor 124 can rank the plurality of storage locations based at least in part on events associated with the plurality of articles, and based at least in part on the plurality of types of the plurality of articles. As previously described above, a rank or ranking can include, but is not limited to, a hierarchical order, a numeric score, a weight, a weighted value, a priority, and a prioritized list.

For example in FIG. 4, a capture processor 124 or word processing capture component can rank a plurality of storage locations based at least in part on events associated with the plurality of articles, and based at least in part on the plurality of types of articles. In this example, the capture processor 124 can rank directories on a hard drive based in part on the number of times a user accessed ".doc"-type word processing files stored on the hard drive versus the number of times a user accessed ".txt"-type word processing files stored on the hard drive. The capture processor 124 or word processing capture component can also rank the storage locations based on a particular type of article, such as ".doc"-type word processing files, and further based on the frequency each particular type of file was accessed by a particular user. Ultimately, the capture processor 124 or word processing capture component can rank the storage locations based on the frequency of access for all of the ".doc"-type word processing files in a first ranking order, then rank the storage locations based on the frequency of access for all of another type of word processing files, such as ".txt"-type files in a second ranking order, and then rank the storage locations based on the frequency of access for all of yet another type of word processing documents, such as ".wpd"-type files in a third ranking order. Moreover, the capture processor 124 and/or word processing capture component can also rank the storage locations first based on the frequency of access, and then based on a number of the particular types of files in each directory. For instance, the capture component 124 can rank directories based on frequency of access, and then the word processing capture component can modify the rank of the directories based on the prevalence of particular types of word processing files in those directories. In this example, various weighting methodologies can be applied depending on weighting of a combination of events associated with articles as well as the types of articles. Furthermore, a capture processor 124 or word processing capture component can also rank the storage locations based on any combination of other types of articles, and/or events associated with the articles in accordance with other embodiments of the invention.

By way of another example, the capture processor 124 can rank the directories associated with the top 20 most frequently accessed files based at least in part on the plurality of types of articles, such as the number of times each of the top 20 most frequently accessed ".doc"-type word processing files has been accessed by a particular user. In this example, a directory associated with a ".doc"-type file that has been accessed 100 times by a particular user can be ranked relatively higher than a directory associated with a ".doc"-type file that has been accessed 75 times by the particular user, which can be ranked relatively higher than a directory associated with a ".doc"-type file that has been accessed 50 times by the particular user. In another example, a directory with a top 20 frequently accessed ".doc"-type file can be ranked relatively higher than a directory with a top 20 frequently accessed ".txt"-type file, which can be ranked relatively higher than a directory with a top 20 frequently accessed ".wpd"-type file. Other combinations of types of articles can be used to rank storage locations in accordance with other embodiments of the invention.

By way of yet another example, the capture processor 124 can rank the network addresses or URLs associated with the last 100 webpages visited by a particular user based at least in part on the types of webpages, such as the number of times each of the ".com"-type webpages was visited by a particular user versus the number of times each of the ".org"-type webpages was visited by the particular user. The capture processor 124 can also rank the storage locations associated with one particular type of article, such as ".com"-type webpages, based on the frequency each article was accessed by a particular user. For instance, a network address or URL associated with a ".com"-type webpage that has been accessed 10 times by a particular user can be ranked relatively higher than a network address or URL associated with a ".com"-type webpage that has been accessed 9 times by the particular user, which can be ranked relatively higher than a network address or URL associated with a ".com"-type webpage that has been accessed 8 times by the particular user. Further, the capture processor 124 can also rank the storage locations based on any combination of other types of articles. For instance, the capture processor 124 can rank the storage locations associated with the ".com"-type webpages in a first ranking order, then rank the storage locations associated with another type of article, such as ".org"-type webpages in a second ranking order, and then rank the storage locations associated with another type of article, such as ".net"-type webpages in a third ranking order. Other combinations of types of articles can be used to rank storage locations in accordance with other embodiments of the invention.

Block 406 is followed by block 408, in which the storage locations are crawled based at least in part on the ranking. Similar to the embodiment described and shown above in block 206 of FIG. 2 and in block 308 of FIG. 3, the capture processor 124 of the embodiment shown in FIG. 4 can crawl storage locations based at least in part on the ranking. As described above in block 206 and block 308, various parameters of a crawl of storage locations can be defined.

By way of example, a capture processor 124 as described in FIG. 4 can crawl directories associated with the top 20 most frequently accessed files on a hard drive associated with the client device 102*a*. Based at least in part on events associated with the top 20 most frequently accessed files, the capture processor 124 can rank the directories in a hierarchical order, such as ranking the directory associated with the most frequently accessed file as first or number "1," ranking the directory associated with the second most frequently accessed file as second or number "2," etc. Utilizing the rank of each directory to crawl the directories in a hierarchical order, the capture processor 124 can capture some or all of the files in each of the directories associated with the top 20 most frequently accessed files. In this manner, the directory containing the most frequently accessed file can be crawled first, and the remaining directories containing the other most frequently accessed files can be crawled according to the hierarchical order. Some or all of the files in these directories can be captured and utilized in a search result.

By way of another example, a word processing capture component as described in FIG. 4 can crawl directories associated with the top 20 most frequently accessed word processing files of a particular type, such as ".doc"-type files, on a hard drive associated with the client device 102*a*. Based at least in part on the types of articles associated with the top 20 most frequently word processing accessed files of a particular type, the word processing capture component can rank the directories in a hierarchical order, such as ranking the directory associated with the most frequently accessed word processing file as first or number "1," ranking the directory associated with the second most frequently accessed word processing file as second or number "2," etc. Utilizing the rank of each directory to crawl the directories in a hierarchical order, the word processing capture component can capture some or all of the files in each of the directories associated with the top 20 most frequently accessed word processing files of a particular type. In this manner, the directory containing the most frequently accessed word processing file can be crawled first, and the remaining directories containing the other most frequently accessed word processing files can be crawled according to the hierarchical order. Some or all of the word processing files in these directories can be captured and utilized in a search result.

By way of yet another example, a capture processor 124 can crawl network addresses or URLs stored on a hard drive associated with the client device 102, wherein the network addresses or URLs are associated with the last 100 webpages of a particular type, such as ".com"-type webpages, visited by a particular user. Based at least in part on the types of articles, such as the number of times each of the last 100 ".com"-type webpages was visited by a particular user, the capture processor 124 can rank the ".com"-type webpages in a hierarchical order, such as ranking the most frequently visited ".com"-type webpage as first or number "1," ranking the second most frequently visited ".com"-type webpage as second or number "2," etc. Utilizing the rank of each webpage to crawl the network addresses or URLs associated with the respective webpages in a hierarchical order, the capture processor 124 can capture some or all of the articles at each of the last 100 ".com"-type webpages visited. In this manner, the most frequently visited ".com"-type webpage can be crawled first, and the other remaining frequently visited ".com"-type webpages can be crawled according to the hierarchical order. Some or all of the articles at these webpages can be captured and utilized in a search result.

The method 400 ends at block 408.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method for crawling articles on a storage device local to a client device, comprising:
   (a) identifying, by an application executing on the client device, a plurality of storage locations located on the client device, each storage location storing a plurality of articles;
   (b) identifying, by the application executing on the client device, events performed by a user of the client device, wherein the events are associated with the plurality of articles;
   (c) ranking, by the application executing on the client device, the plurality of storage locations based at least in part on the events; and
   (d) crawling, by the application executing on the client device, the plurality of storage locations based at least in part on the ranking, the crawling comprising:
     identifying, for one of the storage locations, a duplicate set of storage locations;
     crawling the one of the storage locations and repressing crawls of the duplicate set of storage locations;
     indexing the plurality of articles of at least the one of the storage locations, and
     determining a time to re-crawl based on the plurality of articles of at least the one of the storage locations.

2. The method of claim 1, wherein the plurality of storage locations is located on a single storage device local to the client device.

3. The method of claim 1, wherein the plurality of storage locations is associated with a plurality of storage devices local to the client device.

4. The method of claim 1, wherein the plurality of storage locations comprises at least one of the following: a client side device, a local hard drive, a shared drive, a data storage device.

5. The method of claim 1, wherein events associated with the plurality of articles comprise at least one of the following: editing an article, saving an article to a directory, saving a file to a directory, saving an article to a folder, saving a file to a folder, saving an article, saving a file, receiving an e-mail from a particular sender, and sending an e-mail to a particular recipient.

6. The method of claim 1, wherein the events comprise event data that is obtained from at least one of the following: an operating system, a browser application program, an enabling/monitoring application program, a previous version of a search application program, and a previous version of an application program associated with a search engine application.

7. The method of claim 1, wherein the plurality of articles comprises at least one of the following: a directory, a folder, a file, a webpage, e-mail, a message, and a file associated with an application program.

8. The method of claim 1, wherein identifying a plurality of storage locations comprises at least one of the following: identifying a recently accessed file list, identifying a my favorites list, identifying a my documents folder, identifying a desktop folder, identifying a list of recently accessed files associated with an application program, identifying a folder of recent e-mails, identifying a folder of recent messages, and identifying a cached list of webpages.

9. The method of claim 1, wherein identifying a plurality of storage locations comprises identifying events associated with the plurality of articles.

10. The method of claim 9, wherein the events associated with the plurality of articles comprise at least one of the following: user access of an article, user access of a file, accessing an article, accessing a file, saving an article, saving a file, opening an article, and opening a file.

11. The method of claim 1, wherein identifying a plurality of storage locations comprises identifying characteristics associated with the plurality of articles.

12. The method of claim 11, wherein characteristics associated with the plurality of articles comprises at least one of the following: file size, file type, file recency, a date/time of last access, a date/time of recent access, a date/time of last modification, a date/time of creation, a date, and a time.

13. The method of claim 1, further comprising:
   (e) identifying a plurality of types of the plurality of articles, wherein ranking the plurality of storage locations comprises ranking the storage locations based at least in part on the plurality of types of the plurality of articles.

14. The method of claim 13, wherein identifying a plurality of types of the plurality of articles comprises prioritizing each of the plurality of types, wherein ranking the storage locations based at least in part on the plurality of types comprises ranking the storage locations based at least in part on the prioritizing each of the plurality of types.

15. The method of claim 1, wherein (c) ranking the plurality of storage locations based at least in part on events associated with the plurality of articles comprises prioritizing the plurality of storage locations based on a frequency of the events.

16. The method of claim 1, wherein (c) ranking the plurality of storage locations based at least in part on events associated with the plurality of articles comprises prioritizing the plurality of storage locations based on a recency of the events.

17. The method of claim 15, wherein (d) crawling the storage locations based at least in part on the ranking comprises crawling a predefined number of the plurality of storage locations, wherein the ranking is prioritized from a highest frequency to a lower frequency.

18. The method of claim 1, wherein (d) crawling the storage locations based at least in part on the ranking comprises at least one of the following: crawling a predefined number of storage locations, crawling a predefined number of directories, crawling a top directory in a file hierarchy, crawling a predefined number of folders, crawling a predefined number of articles, crawling a predefined number of files, crawling a predefined number of indexable files, crawling for a predefined amount of time, and crawling to a predefined depth in a folder hierarchy starting from either a root or a predefined starting folder.

19. The method of claim 1, wherein (d) crawling the storage locations based at least in part on the ranking comprises crawling at least some of the storage locations.

20. The method of claim 1, wherein (d) crawling the storage locations based at least in part on the ranking comprises prioritizing the crawling of at least some of the storage locations based at least in part on the ranking.

21. A method for crawling articles on a storage device local to a client device, comprising:
- (a) identifying, by an application executing on the client device, a plurality of storage locations located on the client device, each storage location storing a plurality of articles;
- (b) identifying, by the application executing on the client device, a plurality of types of the plurality of articles;
- (c) ranking, by the application executing on the client device, the plurality of storage locations based at least in part on the plurality of types of the plurality of articles stored by each storage location; and
- (d) crawling, by the application executing on the client device, the plurality of storage locations based at least in part on the ranking, the crawling comprising:
    identifying, for one of the storage locations, a duplicate set of storage locations;
    crawling the one of the storage locations and repressing crawls of the duplicate set of storage locations;
    indexing the plurality of articles of at least the one of the storage locations, and
    determining a time to re-crawl based on the plurality of articles of at least the one of the storage locations.

22. The method of claim 21, wherein the plurality of storage locations is located on a single storage device local to the client device.

23. The method of claim 21, wherein the plurality of storage locations is associated with a plurality of storage devices local to the client device.

24. The method of claim 21, wherein the plurality of storage locations comprises at least one of the following: a client side device, a local hard drive, a shared drive, a data storage device.

25. The method of claim 21, wherein types of the plurality of articles comprise at least one of the following: a file type, a document type, an e-mail type, a message type, and a website domain.

26. The method of claim 21, wherein the plurality of articles comprises at least one of the following: a directory, a folder, a file, a webpage, e-mail, a message, and a file associated with an application program.

27. The method of claim 21, wherein identifying a plurality of storage locations comprises at least one of the following: identifying a recently accessed file list, identifying a my favorites list, identifying a my documents folder, identifying a desktop folder, identifying a list of recently accessed files associated with an application program, identifying a folder of recent e-mails, identifying a folder of recent messages, and identifying a cached list of webpages.

28. The method of claim 21, wherein identifying a plurality of storage locations comprises identifying events associated with the plurality of articles.

29. The method of claim 28, wherein the events comprise event data that is obtained from at least one of the following: an operating system, a browser application program, an enabling/monitoring application program, a previous version of a search application program, and a previous version of an application program associated with a search engine application.

30. The method of claim 21, wherein identifying a plurality of storage locations comprises identifying characteristics associated with the plurality of articles.

31. The method of claim 30, wherein characteristics associated with the plurality of articles comprises at least one of the following: file size, file type, file recency, a date/time of last access, a date/time of recent access, a date/time of last modification, a date/time of creation, a date, and a time.

32. The method of claim 21, wherein (c) ranking the plurality of storage locations based at least in part on the plurality of types of the plurality of articles comprises ranking the plurality of storage locations based at least in part on events associated with the plurality of articles.

33. The method of claim 21, wherein (c) ranking the plurality of storage locations based at least in part on the plurality of types of the plurality of articles comprises prioritizing the plurality of storage locations based at least in part on a frequency of events associated with the plurality of articles.

34. The method of claim 21, wherein (c) ranking the plurality of storage locations based at least in part on the plurality of types of the plurality of articles comprises prioritizing the plurality of storage locations based on a recency of events associated with the plurality of articles.

35. The method of claim 33, wherein (d) crawling the storage locations based at least in part on the ranking comprises crawling a predefined number of the plurality of storage locations, wherein the ranking is prioritized from a highest frequency of events to a lower frequency of events.

36. The method of claim 21, wherein (d) crawling the storage locations based at least in part on the ranking comprises at least one of the following: crawling a predefined number of storage locations, crawling a predefined number of directories, crawling a top directory in a file hierarchy, crawling a predefined number of folders, crawling a predefined number of articles, crawling a predefined number of files, crawling a predefined number of indexable files, crawling for a predefined amount of time, and crawling to a predefined depth in a folder hierarchy starting from either a root or a predefined starting folder.

37. The method of claim 21, wherein (d) crawling the storage locations based at least in part on the ranking comprises crawling at least some of the storage locations.

38. The method of claim 21, wherein (d) crawling the storage locations based at least in part on the ranking comprises prioritizing the crawling of at least some of the storage locations based at least in part on the ranking.

39. A non-transitory computer-readable storage medium containing executable program code, comprising:
- (a) program code for execution on a client device for identifying a plurality of storage locations located on the client device, each storage location storing a plurality of articles;
- (b) program code for execution on the client device for identifying events performed by a user of the client device, wherein the events are associated with the plurality of articles;
- (c) program code for execution on the client device for ranking the plurality of storage locations based at least in part on events; and
- (d) program code for execution on the client device for crawling the plurality of storage locations based at least in part on the ranking, the crawling comprising:
    identifying, for one of the storage locations, a duplicate set of storage locations;
    crawling the one of the storage locations and repressing crawls of the duplicate set of storage locations;
    indexing the plurality of articles of at least the one of the storage locations, and
    determining a time to re-crawl based on the plurality of articles of at least the one of the storage locations.

40. The non-transitory computer-readable storage medium of claim 39, wherein the plurality of storage locations is located on a single storage device local to the client device.

41. The non-transitory computer-readable storage medium of claim 39, wherein the plurality of storage locations is associated with a plurality of storage devices local to the client device.

42. The non-transitory computer-readable storage medium of claim 39, wherein the plurality of storage locations comprises at least one of the following: a client side device, a local hard drive, a shared drive, a data storage device.

43. The non-transitory computer-readable storage medium of claim 39, wherein events associated with the plurality of articles comprise at least one of the following: editing an article, saving an article to a directory, saving a file to a directory, saving an article to a folder, saving a file to a folder, saving an article, saving a file, receiving an e-mail from a particular sender, and sending an e-mail to a particular recipient.

44. The non-transitory computer-readable storage medium of claim 39, wherein the events comprise event data that is obtained from at least one of the following: an operating system, a browser application program, an enabling/monitoring application program, a previous version of a search application program, and a previous version of an application program associated with a search engine application.

45. The non-transitory computer-readable storage medium of claim 39, wherein the plurality of articles comprises at least one of the following: a directory, a folder, a file, a webpage, e-mail, a message, and a file associated with an application program.

46. The non-transitory computer-readable storage medium of claim 39, wherein program code for identifying a plurality of storage locations comprises at least one of the following: program code for identifying a recently accessed file list, program code for identifying a my favorites list, program code for identifying a my documents folder, program code for identifying a desktop folder, program code for identifying a list of recently accessed files associated with an application program, program code for identifying a folder of recent e-mails, program code for identifying a folder of recent messages, and program code for identifying a cached list of webpages.

47. The non-transitory computer-readable storage medium of claim 39, wherein program code for identifying a plurality of storage locations comprises program code for identifying events associated with the plurality of articles.

48. The non-transitory computer-readable storage medium of claim 47, wherein the events associated with the plurality of articles comprise at least one of the following: user access of an article, user access of a file, accessing an article, accessing a file, saving an article, saving a file, opening an article, and opening a file.

49. The non-transitory computer-readable storage medium of claim 39, wherein program code for identifying a plurality of storage locations comprises program code for identifying characteristics associated with the plurality of articles.

50. The non-transitory computer-readable storage medium of claim 49, wherein characteristics associated with the plurality of articles comprises at least one of the following: file size, file type, file recency, a date, and a time.

51. The non-transitory computer-readable storage medium of claim 39, further comprising:
(e) program code for identifying a plurality of types of the plurality of articles, wherein program code for ranking the plurality of storage locations comprises program code for ranking the storage locations based at least in part on the plurality of types of the plurality of articles.

52. The non-transitory computer-readable storage medium of claim 51, wherein the program code for identifying a plurality of types of the plurality of articles comprises program code for prioritizing each of the plurality of types, wherein program code for ranking the storage locations based at least in part on the plurality of types comprises program code for ranking the storage locations based at least in part on the prioritizing each of the plurality of types.

53. The non-transitory computer-readable storage medium of claim 39, wherein (c) the program code for ranking the plurality of storage locations based at least in part on events associated with the plurality of articles comprises program code for prioritizing the plurality of storage locations based on a frequency of the events.

54. The non-transitory computer-readable storage medium of claim 39, wherein (c) the program code for ranking the plurality of storage locations based at least in part on events associated with the plurality of articles comprises program code for prioritizing the plurality of storage locations based on a recency of the events.

55. The non-transitory computer-readable storage medium of claim 53, wherein (d) the program code for crawling the storage locations based at least in part on the ranking comprises program code for crawling a predefined number of the plurality of storage locations, wherein the ranking is prioritized from a highest frequency to a lower frequency.

56. The non-transitory computer-readable storage medium of claim 39, wherein (d) the program code for crawling the storage locations based at least in part on the ranking comprises at least one of the following: program code for crawling a predefined number of storage locations, program code for crawling a predefined number of directories, program code for crawling a top directory in a file hierarchy, program code for crawling a predefined number of folders, program code for crawling a predefined number of articles, program code for crawling a predefined number of files, program code for crawling a predefined number of indexable files, program code for crawling for a predefined amount of time, and program code for crawling to a predefined depth in a folder hierarchy starting from either a root or a predefined starting folder.

57. The non-transitory computer-readable storage medium of claim 39, wherein (d) the program code for crawling the storage locations based at least in part on the ranking comprises program code for crawling at least some of the storage locations.

58. The non-transitory computer-readable storage medium of claim 39, (d) the program code for crawling the storage locations based at least in part on the ranking comprises program code for prioritizing the crawling of at least some of the storage locations based at least in part on the ranking.

59. A non-transitory computer-readable storage medium containing executable program code, comprising:
(a) program code for execution on a client device for identifying a plurality of storage locations located on the client device, each storage location storing a plurality of articles;
(b) program code for execution on the client device for identifying a plurality of types of the plurality of articles;
(c) program code for execution on the client device for ranking the plurality of storage locations based at least in part on the plurality of types of the plurality of articles; and
(d) program code for execution on the client device for crawling the plurality of storage locations based at least in part on the ranking, the crawling comprising:
identifying, for one of the storage locations, a duplicate set of storage locations;

crawling the one of the storage locations and repressing crawls of the duplicate set of storage locations;

indexing the plurality of articles of at least the one of the storage locations, and determining a time to re-crawl based on the plurality of articles of at least the one of the storage locations.

60. The non-transitory computer-readable storage medium of claim 59, wherein the plurality of storage locations is located on a single storage device local to the client device.

61. The non-transitory computer-readable storage medium of claim 59, wherein the plurality of storage locations is associated with a plurality of storage devices local to the client device.

62. The non-transitory computer-readable storage medium of claim 59, wherein the plurality of storage locations comprises at least one of the following: a client side device, a local hard drive, a shared drive, a data storage device.

63. The non-transitory computer-readable storage medium of claim 59, wherein types of the plurality of articles comprise at least one of the following: a file type, a document type, an e-mail type, a message type, and a website domain.

64. The non-transitory computer-readable storage medium of claim 59, wherein the plurality of articles comprises at least one of the following: a directory, a folder, a file, a webpage, e-mail, a message, and a file associated with an application program.

65. The non-transitory computer-readable storage medium of claim 59, wherein the program code for identifying a plurality of storage locations comprises at least one of the following: program code for identifying a recently accessed file list, program code for identifying a my favorites list, program code for identifying a my documents folder, program code for identifying a desktop folder, program code for identifying a list of recently accessed files associated with an application program, program code for identifying a folder of recent e-mails, program code for identifying a folder of recent messages, and program code for identifying a cached list of webpages.

66. The non-transitory computer-readable storage medium of claim 59, wherein program code for identifying a plurality of storage locations comprises program code for identifying events associated with the plurality of articles.

67. The non-transitory computer-readable storage medium of claim 66, wherein the events comprise event data that is obtained from at least one of the following: an operating system, a browser application program, an enabling/monitoring application program, a previous version of a search application program, and a previous version of an application program associated with a search engine application.

68. The non-transitory computer-readable storage medium of claim 59, wherein the program code for identifying a plurality of storage locations comprises program code for identifying characteristics associated with the plurality of articles.

69. The non-transitory computer-readable storage medium of claim 68, wherein the characteristics associated with the plurality of articles comprises at least one of the following: file size, file type, file recency, a date/time of last access, a list of dates/times of recent accesses, a date/time of last modification, a date/time of creation, a date, and a time.

70. The non-transitory computer-readable storage medium of claim 59, wherein (c) the program code for ranking the plurality of storage locations based at least in part on the plurality of types of the plurality of articles comprises program code for ranking the plurality of storage locations based at least in part on events associated with the plurality of articles.

71. The non-transitory computer-readable storage medium of claim 59, wherein (c) the program code for ranking the plurality of storage locations based at least in part on the plurality of types of the plurality of articles comprises program code for prioritizing the plurality of storage locations based at least in part on a frequency of events associated with the plurality of articles.

72. The non-transitory computer-readable storage medium of claim 59, wherein (c) the program code for ranking the plurality of storage locations based at least in part on the plurality of types of the plurality of articles comprises program code for prioritizing the plurality of storage locations based on a recency of events associated with the plurality of articles.

73. The non-transitory computer-readable storage medium of claim 59, wherein (d) the program code for crawling the storage locations based at least in part on the ranking comprises program code for crawling a predefined number of the plurality of storage locations, wherein the ranking is prioritized from a highest frequency of events to a lower frequency of events.

74. The non-transitory computer-readable storage medium of claim 59, wherein (d) the program code for crawling the storage locations based at least in part on the ranking comprises at least one of the following: program code for crawling a predefined number of storage locations, program code for crawling a predefined number of directories, program code for crawling a top directory in a file hierarchy, program code for crawling a predefined number of folders, program code for crawling a predefined number of articles, program code for crawling a predefined number of files, program code for crawling a predefined number of indexable files, program code for crawling for a predefined amount of time, and program code for crawling to a predefined depth in a folder hierarchy starting from either a root or a predefined starting folder.

75. The non-transitory computer-readable storage medium of claim 59, wherein (d) the program code for crawling the storage locations based at least in part on the ranking comprises program code for crawling at least some of the storage locations.

76. The non-transitory computer-readable storage medium of claim 59, wherein (d) the program code for crawling the storage locations based at least in part on the ranking comprises program code for prioritizing the crawling of at least some of the storage locations based at least in part on the ranking.

77. A system for crawling local articles, comprising:

a computer processor for executing computer program instructions;

a computer-readable storage medium having executable computer program instructions tangibly embodied thereon, the executable computer program instructions comprising instructions for:

(a) identifying a plurality of storage locations located on the system, each storage location storing a plurality of articles;

(b) identifying a plurality of types of the plurality of articles;

(c) ranking the plurality of storage locations based at least in part on the plurality of types of the plurality of articles stored by each storage location and based at least in part on events performed by a user of the system wherein the events are associated with the plurality of articles; and (d) crawling the plurality of storage locations based at least in part on the ranking, the crawling comprising:

identifying, for one of the storage locations, a duplicate set of storage locations;
crawling the one of the storage locations and repressing crawls of the duplicate set of storage locations;
indexing the plurality of articles of at least the one of the storage locations, and determining a time to re-crawl based on the plurality of articles of at least the one of the storage locations.

* * * * *